US007882254B2

(12) United States Patent
Choi et al.

(10) Patent No.: US 7,882,254 B2
(45) Date of Patent: Feb. 1, 2011

(54) COMMON PROTOCOL LAYER ARCHITECTURE AND METHODS FOR TRANSMITTING DATA BETWEEN DIFFERENT NETWORK PROTOCOLS AND A COMMON PROTOCOL PACKET

(75) Inventors: Kwang-Soon Choi, Incheon (KR);
Seung-Ok Lim, Yongin-si (KR);
Kwangmo Jung, Yongin-si (KR);
Kyeung-Hak Seo, Seoul (KR)

(73) Assignee: Korea Electronics Technology Institute, Gyeonggi-Do (KR)

( * ) Notice: Subject to any disclaimer, the term of this patent is extended or adjusted under 35 U.S.C. 154(b) by 1186 days.

(21) Appl. No.: 10/536,189

(22) PCT Filed: Nov. 25, 2003

(86) PCT No.: PCT/KR03/02542

§ 371 (c)(1),
(2), (4) Date: May 24, 2005

(87) PCT Pub. No.: WO2004/049671

PCT Pub. Date: Jun. 10, 2004

(65) Prior Publication Data

US 2006/0053229 A1    Mar. 9, 2006

(30) Foreign Application Priority Data

Nov. 25, 2002   (KR)   .................. 10-2002-0073667

(51) Int. Cl.
*G06F 15/16* (2006.01)
(52) U.S. Cl. .................. 709/230; 709/236; 370/466
(58) Field of Classification Search ............ 709/230, 709/246; 370/466
See application file for complete search history.

(56) References Cited

U.S. PATENT DOCUMENTS 5,251,205 A * 10/1993 Callon et al. ............. 370/392

(Continued)

FOREIGN PATENT DOCUMENTS

JP    1991-278260    12/1991

(Continued)

OTHER PUBLICATIONS

Rich, Seifert, "The Switch Book", Published 2000, John Wiley & Sons, Inc., pp. 4-10, 166, 535-537, 555, and 600-601.*

(Continued)

*Primary Examiner*—Bunjob Jaroenchonwanit
(74) *Attorney, Agent, or Firm*—Greenblum & Bernstein P.L.C.

(57) ABSTRACT

The present invention provides common protocol architecture and methods for transmitting data between different network protocols and a common protocol packet. The common protocol architecture comprises an application layer; a common protocol layer positioned under the application layer, the common protocol layer enabling data communications between the different protocols; a presentation layer positioned under the common protocol layer; a session layer positioned under the presentation layer; a transport layer positioned under the session layer; a network layer positioned under the transport layer; a data link layer positioned under the network layer; and a physical layer positioned under the data link layer. The common protocol packet comprises a common protocol header with information about a packet and a payload with the contents of data. By designing the common protocol layer and the common protocol packet accepting various protocols simultaneously, the present invention can improve compatibility between different protocols.

33 Claims, 47 Drawing Sheets

U.S. PATENT DOCUMENTS

| | | | | |
|---|---|---|---|---|
| 5,619,650 | A | * | 4/1997 | Bach et al. ............... 709/246 |
| 5,852,660 | A | | 12/1998 | Lindquist et al. |
| 6,141,686 | A | * | 10/2000 | Jackowski et al. .......... 709/224 |
| 6,483,870 | B1 | * | 11/2002 | Locklear et al. ............ 375/222 |
| 6,804,776 | B1 | * | 10/2004 | Lothberg et al. ........... 713/160 |
| 6,820,120 | B1 | * | 11/2004 | Keats et al. ................ 709/223 |
| 7,082,140 | B1 | * | 7/2006 | Hass ......................... 370/466 |
| 7,159,030 | B1 | * | 1/2007 | Elzur ......................... 709/238 |
| 7,191,248 | B2 | * | 3/2007 | Chattopadhyay et al. .... 709/238 |
| 7,209,962 | B2 | * | 4/2007 | Boden ........................ 709/223 |
| 7,239,613 | B1 | * | 7/2007 | Canning et al. ............. 370/254 |
| 7,453,892 | B2 | * | 11/2008 | Buskirk et al. .............. 370/401 |
| 7,584,274 | B2 | * | 9/2009 | Bond et al. ................. 709/223 |
| 7,636,722 | B2 | * | 12/2009 | Bunkerr et al. ................... 1/1 |
| 7,644,432 | B2 | * | 1/2010 | Patrick et al. ................. 726/1 |
| 7,703,102 | B1 | * | 4/2010 | Eppstein et al. ............ 718/104 |
| 2001/0012294 | A1 | | 8/2001 | Kadambi et al. |
| 2001/0039589 | A1 | * | 11/2001 | Aho et al. .................. 709/230 |
| 2003/0225887 | A1 | * | 12/2003 | Purnadi et al. .............. 709/227 |

FOREIGN PATENT DOCUMENTS

| | | |
|---|---|---|
| JP | 2000-183874 | 6/2000 |
| KR | 1999-0061003 | 7/1999 |

OTHER PUBLICATIONS

Nevenko Bartolincic, "Network Management" [online], Aug. 2000, [retrieved Sep. 2008] Slide 26, retrieved from <http://www.ceenet.org/workshops/lectures2000/Nevenko_Bartolincic/network_mgmt/sld001.htm>.*

J. Case et al., "A Simple Network Management Protocol (SNMP)" [online], May 1990,[retrievied Sep. 2008] p. 1-2 and 16-22 retrieved from <http://www.ietf.org/rfc/rfc1157.txt>.*

RFC791, "Internet Protocol: DARPA Internet Program Protocol Specification" [online], Sep. 1981 [retrieved Jun. 2010], <http://tools.ietf.org/pdf/rfc791.pdf>, pp. 1-52.*

RFC1157, Case et al., "A Simple Network Management Protocol (SNMP)" [online], May 1990 [retrieved Jun. 2010], <http://tools.ietf.org/pdf/rfc1157.pdf>, pp. 1-37.*

RFC2784, Farinacci et al., "Generic Routing Encapsulation (GRE)" [online], Mar. 2000 [retrieved Jun. 2010], <http:tools.ietif.org/pdf/rfc2784.pdf>, pp. 1-10.*

English Language Abstract of KR 1999-0061003.

English Language Abstract of JP 2000-183874.

English Language Abstract of JP 1991-278260.

U.S. Appl. No. 10/528,188 to Jung et al., filed Mar. 17, 2005.

* cited by examiner

Fig. 9

| Packet Type (PT) — 320 | | | | | | | |
|---|---|---|---|---|---|---|---|
| 0x00 | 0x01~0x0F | 0x10 | 0x11 | 0x12 | 0x13 | 0x14~0x1F | |
| Unicast | reserved | Cluster-Multicast | Domain-Multicast | HS-Multicast | Broadcast | reserved | |

Fig. 10

| Management Packet (MP) | | | |
|---|---|---|---|
| Hex | Packet | Direction | Description |
| 0x00 | No MP | | indicates that this packet is not a MP |
| 0x01 | DRREQ | Dev. →HS | Device Registration Request |
| 0x02 | DRRES | HS→Dev. | Device Registration Response |
| 0x03~0x10 | reserved | | |
| 0x11 | HRREQ | HS→HS | Home Station Registration Request |
| 0x12 | HRRES | HS→HS | Home Station Registration Response |
| 0x13 | HRIND | HS→Dev. | Home Station Registration Indication |
| 0x14~0x20 | reserved | | |
| 0x21 | HRSREQ | HS→HS | Home Station Registration Start Request |
| 0x22 | HRSRES | HS→HS | Home Station Registration Start Response |
| 0x23~0x30 | reserved | | |
| 0x31 | ACREQ | Any→Any | Alive-Check Request |
| 0x32 | ACRES | Any→Any | Alive-Check Response |
| 0x33~0x40 | reserved | | |
| 0x41 | RSREQ | Any→Any | Report-Status Request |
| 0x42 | RSRES | Any→Any | Report-Status Response |
| 0x43 | RSIND | Any→Any | Report-Status Indication |
| 0x44~0x50 | reserved | | |

Fig. 11

| Management Packet (MP) | | | |
|---|---|---|---|
| Hex | Packet | Direction | Description |
| 0x51 | VODREQ | Any→HS | VOD Request |
| 0x52 | VODRES | HS→Any | VOD Response |
| 0x53~0x60 | reserved | | |
| 0x61 | BRCTREQ | Any→HS | Broadcasting Request |
| 0x62 | BRCTRES | HS→Any | Broadcasting Response |
| 0x63~0x70 | reserved | | |
| 0x71 | WGIREQ | Dev.→HS | WAN Gateway Interface Request |
| 0x72 | WGIRES | HS→Dev. | WAN Gateway Interface Response |
| 0x73 | WGIIND | HS→Dev. | WAN Gateway Interface Indication |
| 0x74~0x80 | reserved | | |
| 0x81 | SGIREQ | Dev.→HS | Stream Gateway Interface Request |
| 0x82 | SGIRES | HS→Dev. | Stream Gateway Interface Response |
| 0x83 | SGIIND | HS→Dev. | Stream Gateway Interface Indication |
| 0x74~0x80 | reserved | | |
| 0xF1 | ADEV | HS→Any | Add Device |
| 0xF2 | DDEV | HS→Any | Delete Device |
| 0xF3 | IDEV | HS→Dev. | Initialize Device |
| 0xF4~0xFE | reserved | | |
| 0xFF | | for UHCP | indicates that payload has UHCP packet |

Fig. 24

| Execution message (0001) | act (0001) | transaction ID | length | command attributes |
|---|---|---|---|---|

| | register (0011) | transaction ID | length | device control attributes |
|---|---|---|---|---|

| | response (0010) | transaction ID | length | ok or error code |
|---|---|---|---|---|

Fig. 25

| Query message (0010) | act (0001) | transaction ID | length | attributes |

| device directory (0011) | transaction ID | length | no payload |

| attribute directory (0100) | transaction ID | length | no payload |

| response (0010) | transaction ID | length | device directory information, attribute direcotry information, attribute status, or error code |

COMMON PROTOCOL LAYER ARCHITECTURE AND METHODS FOR TRANSMITTING DATA BETWEEN DIFFERENT NETWORK PROTOCOLS AND A COMMON PROTOCOL PACKET

TECHNICAL FIELD

The present invention relates to a common protocol architecture for transmitting data between different network protocols and, more particularly, an architecture of a common protocol layer and a structure of a common protocol packet, which adopt various network protocols such as IP, Bluetooth, IEEE1394, and LonTalk and enable communication among them.

BACKGROUND ART

In the modern telecommunications industry, standard communications systems are linked to each other using protocols based on the Open Systems Interconnection (hereinafter referred to as "OSI") model. The goal of OSI is to create an open system networking environment where any vendor's computer system, connected to any network, can freely share data with any other computer system on that network. In fact, the OSI model would allow any terminal connected to any computer to access any application on any other computer provided that the computers were connected by some form of common network. In networks adopting the OSI reference model, data flow between systems is performed through the OSI environment. The OSI model for network communications defines seven layers, each of which performs specific communications operations independent of the other layers. The seven layers are divided largely into upper layers and lower layers. The upper application-oriented layers perform services related to session management, data abstraction, and applications. The upper layers provide services that handle the applications, and the structuring, and encoding of data. The lower, network-dependent, layers provide services related to the physical connections, types of links, and routing functions. The lower layers provide transparent connections over diverse network configurations and a consistent interface to the upper layers.

The upper layers comprise an application layer, a presentation layer, and a session layer. The application layer executes protocols for user and network operation management and enables communications between the users' CPUs (central processing units). This layer provides services to the user and applications, such as job control, file transfer facilities, electronic mail, virtual terminal and directory services. The presentation layer has structure for communication between function modules of the application layer and handles presentation formats of information. This layer negotiates a common syntax used to encode data for data transfer and allows data to be transferred, independent of hardware considerations. The session layer controls dialog between the application layers. This layer provides organizing functions for synchronizing dialog and session recovery from lower layer problems.

The lower layers comprise a transport layer, a network layer, a data link layer, and a physical layer. The transport layer enables correct communications between terminals even if the upper layers do not consider the quality of line or physical constitution of additional systems. This layer provides an interface between the upper layers and the lower layers, concealing the detailed functional operation of the physical network connections to provide a network-independent service to the application-oriented upper layers. The network layer provides data transfer services. This layer provides addressing and routing functions, and may also include flow control between networks. The data link layer transmits data correctly without a hitch by enhancing reliability of a physical link in a logic network. This layer takes the information provided by the physical layer and adds error detection and retransmission functions. At this stage data is treated as units of data. The physical layer defines a physical interface between physical media, and transmits and receives bits according to the transmission requirement from the data link layer.

In an open system, user program data in a system A is entered into OSI environment and the data is transferred from the application layer to the physical layer in sequence to transmission media. Here, the data is enclosed in frames used in a high-level data link control (hereinafter referred to as "HDLC") procedure prior to transmission. The frame passes a data switching network, so-called a relay open system in the OSI model, and arrives at a receiving computer in the open system. In the receiving computer, the data is passed from the physical layer to the application layer in sequence and, finally, transmitted to an application process B, the destination in a system B in the open system.

The data flow between systems may be performed between systems or a system and a terminal connected to another system. However, communications between more than two systems with different protocols is restricted. Thus, a protocol converter is required to perform data communications between different communication networks.

As a prior art, U.S. Pat. No. 5,852,660, Lindquist et al., discloses a network protocol conversion module within a telecommunications system. The U.S. patent provides a method and apparatus for enabling telecommunications signals containing application layer data generated by a first SS7 (Signaling System No. 7) telecommunications network to be transported across a second SS7 telecommunications network, wherein the first SS7 telecommunications network and the second SS7 telecommunications network are incompatible.

Conventional protocol converters allow two different protocols to exchange data between CPUs. It means direct data exchange between applications, or data exchange using simple logic between devices. In those conventional protocol converters, time delay is generated while the CPU performs other tasks. In addition, while one CPU receives signals and exchanges responses with the inside of system, a load on the CPUs and a waste of time are caused thereby incurring a large loss in the view of performance.

Conventional protocol conversion methods for communications between various network protocols are classified into three classes.

First, there is 1 to 1 protocol conversion method. This method converts a particular layer of a particular protocol into a corresponding layer of another protocol, based on the seven-layered OSI model. In order to convert m layers, m conversion methods are required and in order to convert n protocols, $_nC_2$ methods are required. As a result, $m\square_nC_2$ methods are required in total. Therefore, for data exchange between various network protocols having various protocol layers, a lot of conversion methods are required thereby causing great complexity.

Second, there is a method of converting into a particular protocol. This means to convert n network protocols into a particular network protocol selected from the n network protocols. In order to convert n network protocols into a particular protocol, (n−1) conversion methods are required and in order to convert m layers, m conversion methods are required for each protocol. As a result, m☐(n−1) methods are required in total. Although it shows less complexity in converting network protocols compared to the first method, it still requires a lot of protocol conversions.

Third, there is a method of utilizing an overlay way. For example, it is IP-over-IEEE1394, IP-over-ATM, and so on. These are structures that an internet protocol, IP, is laid on an IEEE1394 or ATM layer. They do not perform particular conversions and are not data exchange methods between different network protocols. In other words, in the IP-over-IEEE1394, an apparatus in an IEEE1394 network transmits IEEE1394 data laid on the IP and receives data through the IP. The data received through the IP is passed through the IEEE1394 layer so that the IEEE1394 apparatus can accept the data. Therefore, it is not data exchange between different network protocols.

For example, U.S. Pat. No. 5,715,250, Watanabe, discloses an ATM-LAN (asynchronous transfer mode local area network) connection apparatus capable of connecting terminals of different protocol standards. The U.S. patent provides a small-scale ATM-LAN connection apparatus which enables communications between first and second ATM terminals of different standards, namely, the first ATM terminal of a LAN emulation protocol and the second ATM terminal of an IP over ATM protocol.

However, the above-mentioned conventional protocol conversion methods have problems such as complexity in conversion methods, complexity due to different layer architectures and roles of protocols, and complexity in accessing apparatuses in different networks. In other words, the number of conversion methods increases in proportion to the number of network protocols to be converted and the number of layers in the network protocols to be converted, thereby increasing complexity. In addition, when the protocol conversion is performed, the complexity increases by times of a particular factor, because the protocol layer architectures and roles of each layer in each network protocol are very different based on the seven-layered OSI model. The particular factor may depend on the number of option fields and tasks to be treated in each protocol layer. Moreover, there is no common address hierarchy recognizable between different network apparatuses when communications between the different network apparatuses are performed.

DISCLOSURE OF INVENTION

Accordingly, the present invention is directed to common protocol layer architecture and methods for transmitting data between different network protocols and a common protocol packet that substantially obviates one or more problems due to limitations and disadvantages of the related art.

An object of the present invention is to provide methods of designing common protocol layer architecture and a common protocol packet structure capable of processing various network protocols, inserting a common protocol layer under an application layer in general protocol layer architecture, giving a common address to all apparatuses in networks, and identifying operation status of each apparatus in each network using the common protocol.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the object and other advantages and in accordance with the purpose of the invention, as embodied and broadly described herein, the present invention provides common protocol layer architecture for transmitting data between different network protocols adopting the OSI reference model which divides the function of communicating between applications in a communication network into specific simplified tasks, comprising:

an application layer positioned at the top of the layer architecture;

a common protocol layer positioned under the application layer, the common protocol layer enabling data communications between the different network protocols;

a presentation layer positioned under the common protocol layer;

a session layer positioned under the presentation layer;

a transport layer positioned under the session layer;

a network layer positioned under the transport layer;

a data link layer positioned under the network layer; and a physical layer positioned under the data link layer.

In addition, the present invention provides common protocol layer architecture for transmitting data between different network protocols based on the OSI reference model, comprising a common protocol layer positioned under an application layer, the common protocol layer enabling data communications between the different network protocols. The common protocol layer functions as an internal interface for QoS, security, and communication management inside a home station chip.

In another aspect, the present invention provides a method of transmitting data between different network protocols having network protocol layer architecture adopting the OSI reference model, comprising the step of transmitting data through a common protocol layer, which enables communications between the different network protocols. In addition, the present invention provides a method of transmitting data between different network protocols having network protocol layer architecture based on the OSI reference model, comprising the step of transmitting data through a common protocol layer positioned under an application layer, the common protocol layer enabling data communications between the different network protocols. The common protocol layer functions as an internal interface for QoS, security, and communication management inside a home station chip.

In another aspect, the present invention provides a common protocol packet for transmitting data between different network protocols, comprising a common protocol header with information about a packet and a payload with the contents of data.

Nowadays, with the advent and development of various network protocols, development of various middlewares and hardware platforms adopting the various network protocols, and increased interests in home networking, a lot of network protocols and middlewares are competing in order to be standards for internal and external network in home networking. Accordingly, the present invention describes a common protocol structure capable of accepting all of these various protocols and conversion techniques on the protocol layers for communications between them.

BRIEF DESCRIPTION OF THE DRAWINGS

Further objects and advantages of the invention can be more fully understood from the following detailed description taken in conjunction with the accompanying drawings, in which:

FIG. 9 is a view for describing an example of a packet type in an option field;

FIG. 10 is a view for describing an example of a management packet in an option field;

FIG. 11 is a view for describing an example of a management packet in an option field (continued);

FIGS. 18a through 19c are views for describing an example of a VOD MPEG stream packet;

FIG. 24 is a view for describing an example of a UHCP packet having execution message;

FIG. 25 is a view for describing an example of a UHCP packet having query message.

BEST MODE FOR CARRYING OUT THE INVENTION

Reference will now be made in detail to the preferred embodiments of the present invention, examples of which are illustrated in the accompanying drawings.

Figure 1:
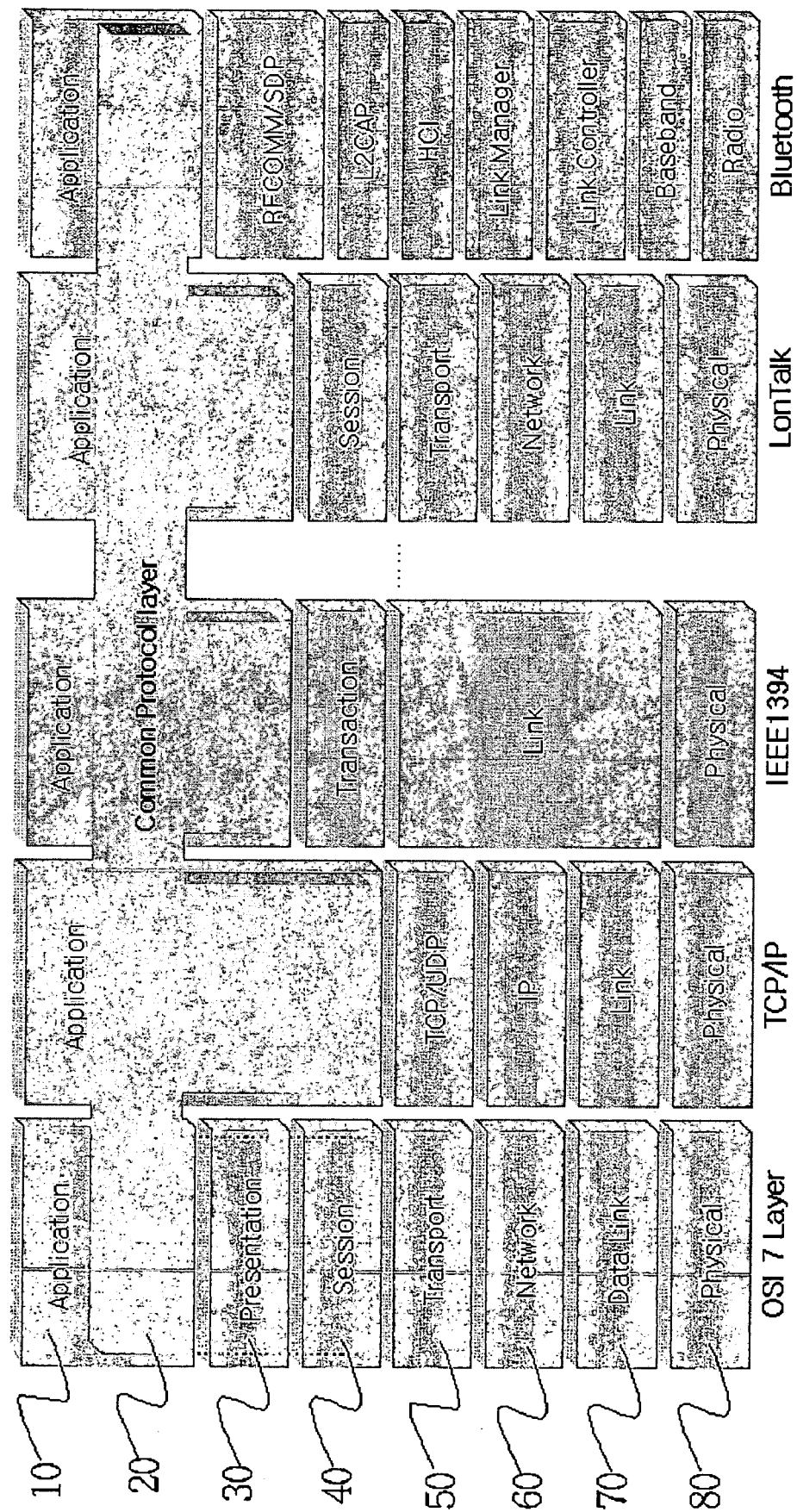
FIG. 1 is a structure chart of common protocol layer architecture according to the present invention.

FIG. 1 is a structure chart of common protocol layer architecture according to the present invention. In FIG. 1, a common protocol layer (20) may be positioned within or under an existing application layer (10). The other layers include a presentation layer (30), a session layer (40), a transport layer (50), a network layer (60), a data link layer (70), and a physical layer (80). A network protocol comprising a common protocol layer includes all network protocols based on the OSI reference model. For example, there are TCP/IP used in networks such as Internet, Intranet, or Extranet, IEEE 1394 protocol used in network communications under Linux™ operating systems, LonTalk™ protocol that embodies user-oriented system, and Bluetooth™ protocol used in wireless networks.

A method of transmitting data through network protocol layers according to the present invention comprises the steps of:

transmitting data through an application layer which enables communications services between two terminals;

transmitting data through a common protocol layer which performs packet switching, broadcast or multicast, address conversion, device control, packet classification, security, congestion access control, resource management, and so on;

transmitting data through a presentation layer which converts data inputted or outputted from a presentation form into other presentation form;

transmitting data through a session layer which is set up to exchange messages between terminal host programs, controls synchronization of data, and constitutes a communication session;

transmitting data through a transport layer which manages control and errors to secure reliable transmission of data between terminals;

transmitting data through a network layer which controls data channels so that packets can be sent to a right receiver;

transmitting data through a data link layer which performs error control and synchronization in a physical level, and identifies and manages transmission; and transmitting data through a physical layer which transmits bit strings through a network systemized electrically and mechanically and provides hardware means to exchange data through transmission media.

For examples of such a method, there can be a method of transmitting data through TCP/IP protocol, IEEE1394 protocol, LonTalk protocol, or Bluetooth protocol.

Figure 2:
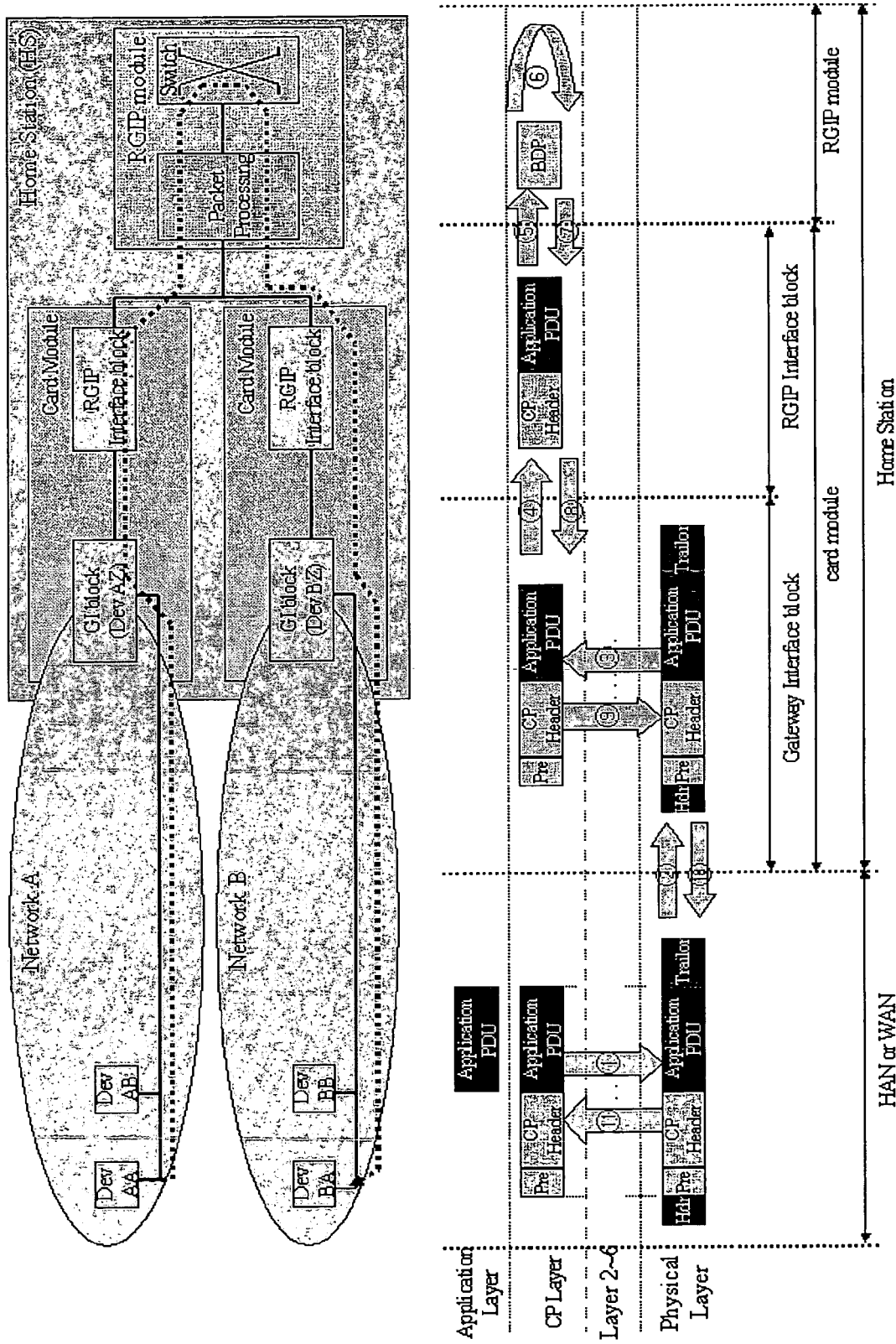
FIG. 2 is an example illustrating a practical use of a common protocol according to the present invention.
Figure 3:
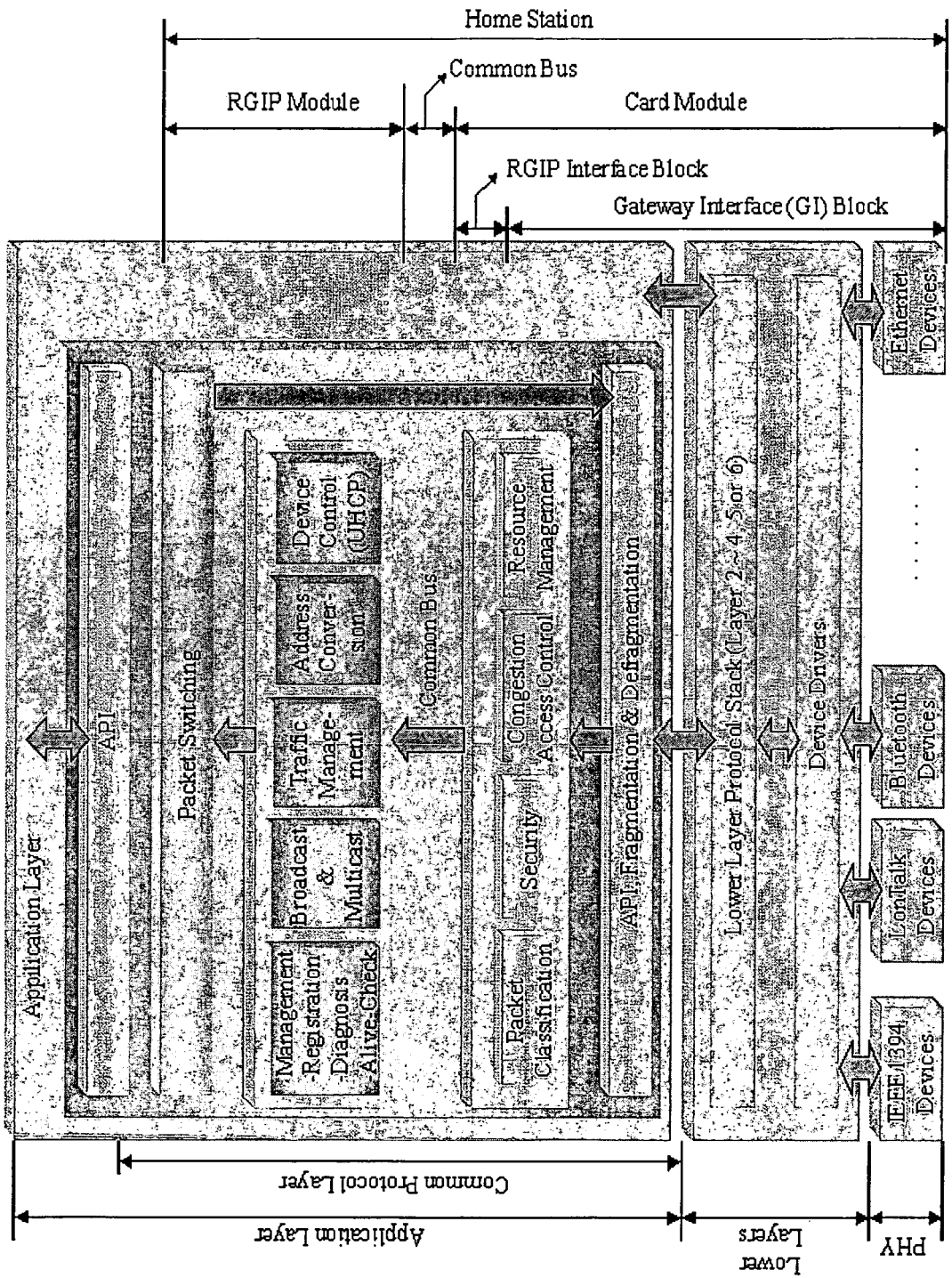
FIG. 3 is a structure chart of protocol layers of a chipset and a home station supporting a common protocol.

FIG. 2 illustrates a practical use of a common protocol according to the present invention. In FIG. 2, a device AA in a network A transmits data to a device BA in a network B using a chipset supporting the common protocol. A protocol layer supported by the chipset and a protocol layer of a home station is shown in FIG. 3. The data in an application layer of the device AA is passed through the common protocol layer and change into an application protocol data unit (hereinafter referred to as "APDU") with attachment of a preamble and a common protocol header to the fore part thereof. Then, when the APDU is passed from the presentation layer (layer 6) to the physical layer, each header and trailer corresponding to each protocol layer are attached to the APDU. The resulting packet reaches an interface module AZ, which can process the common protocol through transmission media in each protocol network, positioned outside the chipset. In the module AZ, the packet is passed from the physical layer to the layer 6. Here, each header and trailer corresponding to each layer are detached from the packet and the packet arrives at the application layer of the module AZ. The application layer of the module AZ checks the preamble of the APDU packet received to identify whether the preamble uses a common protocol. If the preamble uses the common protocol, the module AZ removes the preamble from the packet received and transmits the remaining common protocol packet. If the preamble does not correspond to the common protocol, the module AZ perceives that the destination of the packet received is its own device and processes the data received in its own application layer.

Subsequently, inside the chipset receiving the common protocol packet, switching is performed based on the address information in the common protocol header (210) to send the common protocol packet to an external interface module BZ. The interface module BZ perceives the packet received as application data and passes it through the common protocol layer (20) to attach a preamble and a common protocol header (210) to it. Then, the packet is passed from the layer 6 to the physical layer and transmitted to the destination, device BA, through transmission media. In the device BA, the packet transmitted is passed from physical layer (80) to the layer 6 to reach the common protocol layer (20). The application layer checks the preamble of the packet received to identify that the APDU was transmitted from the other network and passed through the common protocol layer (20).

FIG. 3 illustrates a structure chart of protocol layers of a chipset and a home station supporting the common protocol. The common protocol layer in the common protocol layer architecture performs packet switching, broadcast or multicast, address conversion, device control, packet classification, security, congestion access control, resource management, and so on.

Figure 4:
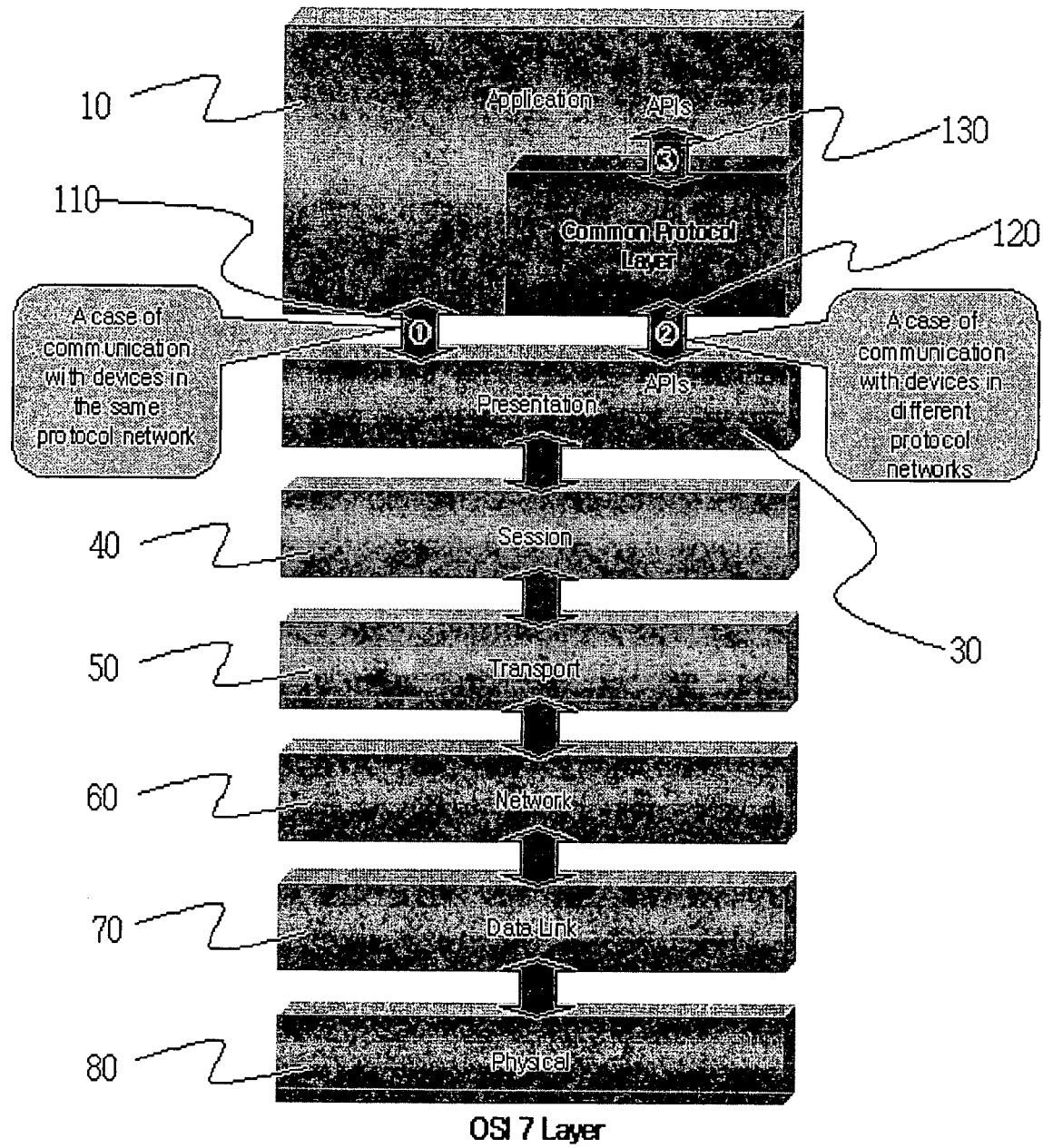
FIG. 4 is a structure chart of protocol layers of a device supporting a common protocol.

FIG. 4 illustrates protocol layer architecture of a device supporting the common protocol. In a network, a device supporting the common protocol has to use the common protocol layer. In FIG. 4, path ① (110) is a case for a device to communicate with another device in the same network using the same network protocol. Path ② (120) is a case for a device to communicate with a device in other network using the common protocol. Particularly, in the path ③ (130), in order to perform smooth communications between the common protocol and an existing protocol, the common protocol layer has to support a particular API (application program interface) for communications with the application layer of the existing protocol.

Figure 5:
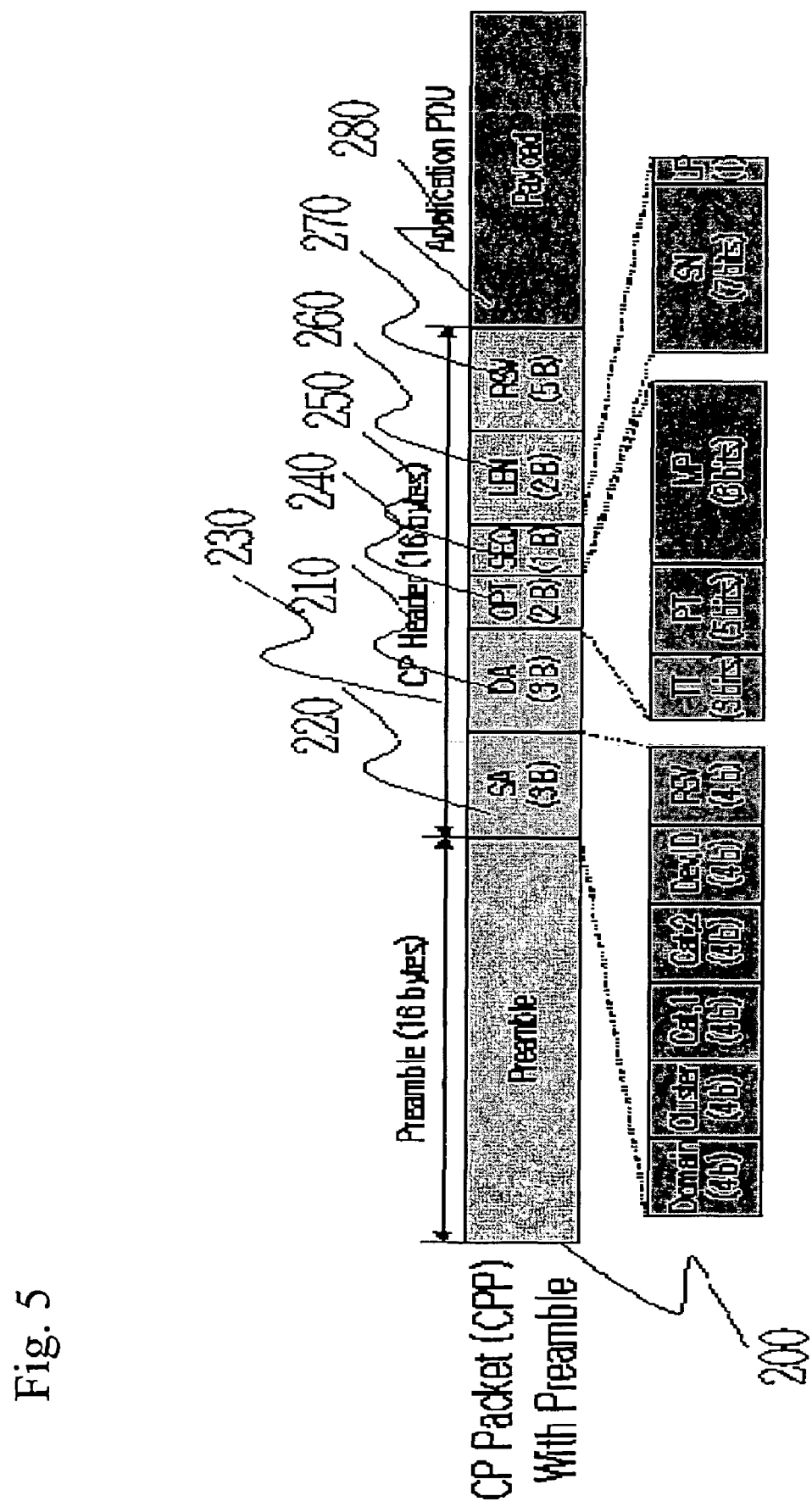
FIG. 5 is a structure chart of a common protocol packet according to the present invention.

FIG. 5 illustrates a structure chart of a common protocol packet according to the present invention. As shown in FIG. 5, APDU is data formed in the application layer and is transmitted to the common protocol layer in case of communications with a device in a different network. A common protocol packet (200) is 32 bytes in size, comprising a preamble of 16 bytes and a common protocol header (210) of 16 bytes. The common protocol header comprises a source address (220), a destination address (230), an option field (240), a sequence field (250), a length field (260), and a reserved field (270) for use hereafter.

The preamble is used to inform whether the packet inputted was passed through the common protocol layer and to contain authentication key or authentication password to prevent access to internal network without permission.

The source address (220) represents a common address of a transmitting side and can be understood only by the common protocol layer (20) and the application layer (10) corresponding to the common protocol layer. The source address is mapped to each physical address of all devices in a network and has to be managed collectively by a gateway accepting the common protocol. In the management of the source address, the physical address of the device and the corresponding common address have to be managed simultaneously.

If the source address is designed so that the application layer (10) and a user can identify structure of internal network and devices used in a network just from the source address, there may be many advantages in the management. To this end, the common protocol has to have a fixed rule for its address hierarchy. The destination address (230) has the same structure as that of the source address and is a common address of a receiving side.

Figure 6:
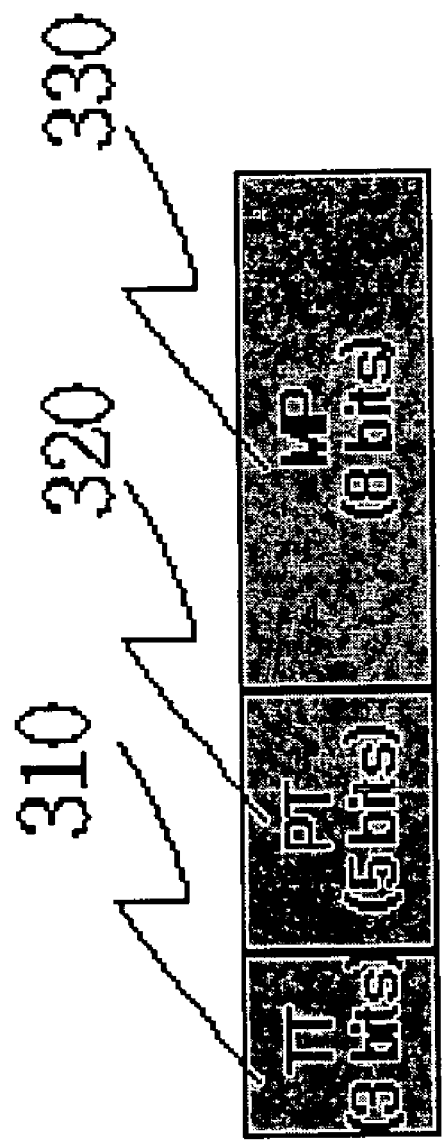
FIG. 6 is a view for describing a structure of an option field.

FIG. 6 is a view for describing a structure of the option field (240). The option field (240) is 2 bytes in size and comprises a traffic type (TT) (310) of a packet, a packet type (PT) (320) and a management packet (MP) (330).

Figure 7:
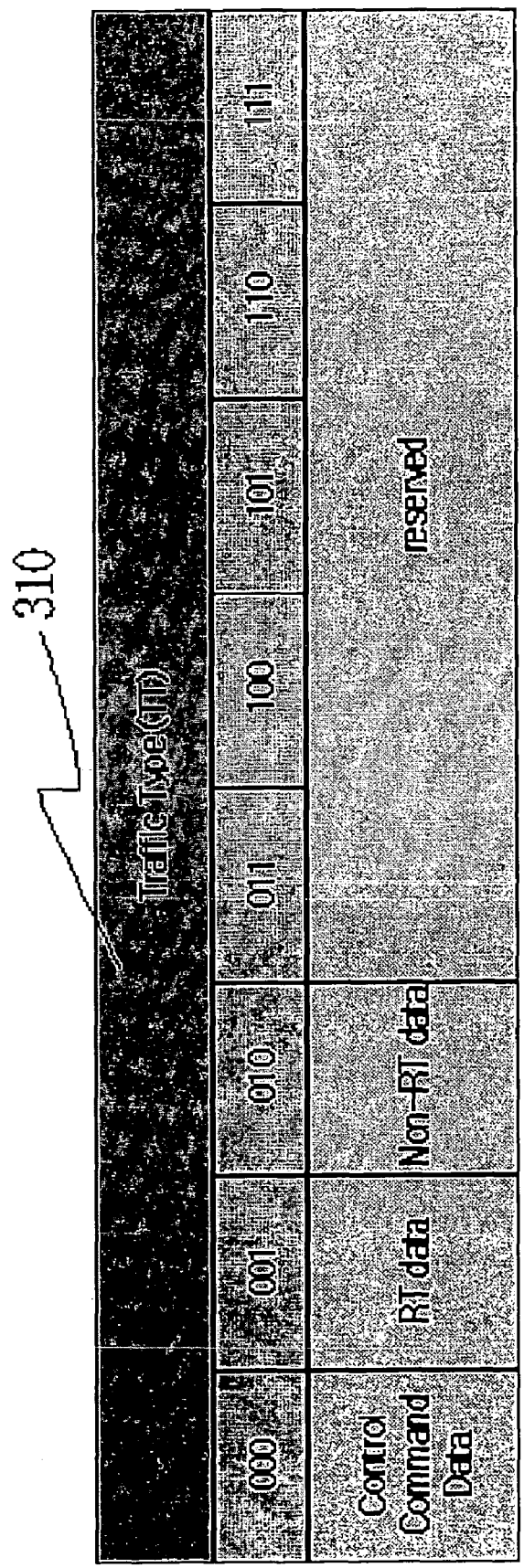
FIG. 7 is a view for describing an example of a traffic type in an option field.

FIG. 7 shows an example of the traffic type (310). The traffic type is one selected from the group of control command data, real time data, and non-real time data for urgency of packet and quality of service (hereinafter referred to as "QoS"). The control command data means data used to control devices in home. The real time data is used to represent data for entertainments such as audio, video, and games to be treated in real time. The non-real time data is used to stand for other data than the real time data, such as internet data.

Figure 8:
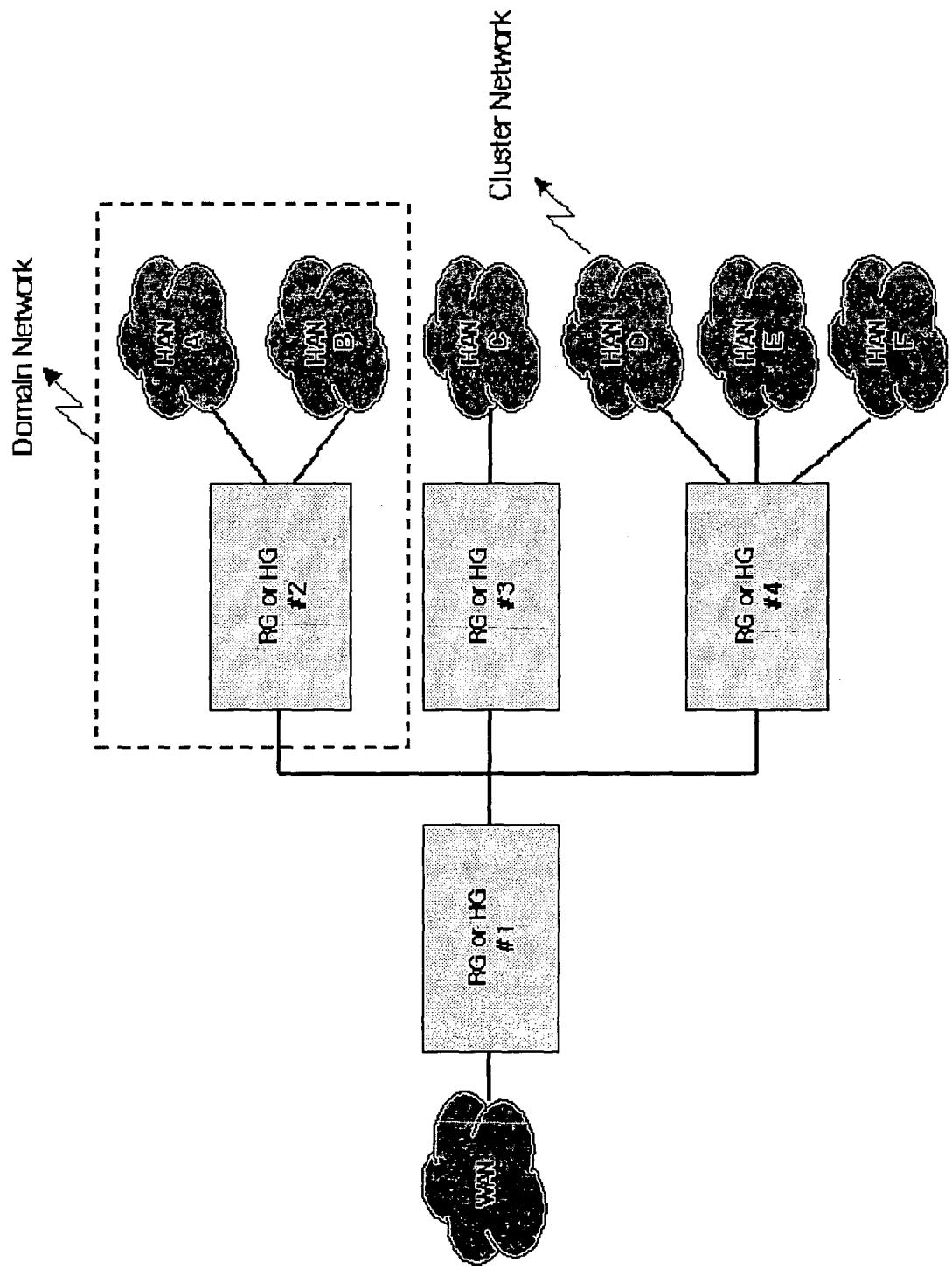
FIG. 8 is a view for describing a domain network and a cluster network.

FIG. 8 illustrates a domain network and a cluster network. A home network may comprise more than one residential gateway (RG) or home gateway (HG). A network comprising one RG or HG is defined as a domain network. And a protocol network connected to the RG or HG is defined as a cluster network.

FIG. 9 shows an example of the packet type field (320). The packet type field defines a transmission method of a packet and provides various transmission methods such as unicast, broadcast, and multicast. In the domain and the cluster network structure, employable transmission methods may include a unicast method for 1 to 1 communications, a broadcast method for 1 to all devices communications, and a multicast method for 1 to a plurality of devices communications. In detail, examples of the multicast method may include a cluster-multicast to perform communications between devices in a cluster, a domain-multicast to perform communications between devices in a domain, and an RG-multicast to perform communications between RGs.

FIGS. 10 and 11 show an example of the management packet (330). The management packet field, which is provided in the common protocol, is a field specially defined for home network management. The management packet field is 1 byte in size.

Figure 12:
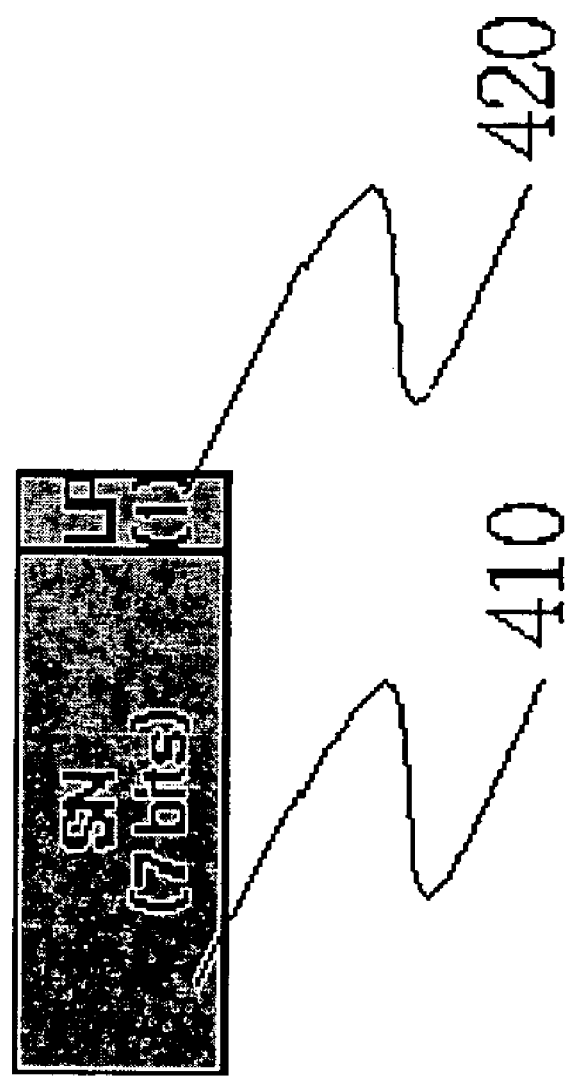
FIG. 12 is a view for describing a structure of a sequence field.

FIG. 12 illustrates structure of the sequence field (250). Since the common protocol layer is positioned between the application layer and the presentation layer, each layer in a protocol may use a different maximum transmission unit (hereinafter referred to as "MTU") in data exchange with an upper or lower layer thereof. Therefore, the payload part of the common protocol packet has to be segmented before transmission and the receiving part has to reassemble the segmented payload. The sequence field is used in the segmentation and reassembly process and comprises a sequence number field (410) for indication of a present sequence number in the segmentation and a last packet field (420) for indication of the last packet.

The length field (260) stands for magnitude of the application data that is positioned behind the common protocol header (210).

The management packet field is described in detail. According to value of the management packet field, the common protocol packet becomes one packet selected from the group of a device registration packet, an RG or home station registration packet, an alive-check packet, a report-status packet, a VOD or broadcasting MPEG stream packet, a WAN or stream gateway interface packet, and an address table management packet.

Figure 13A:
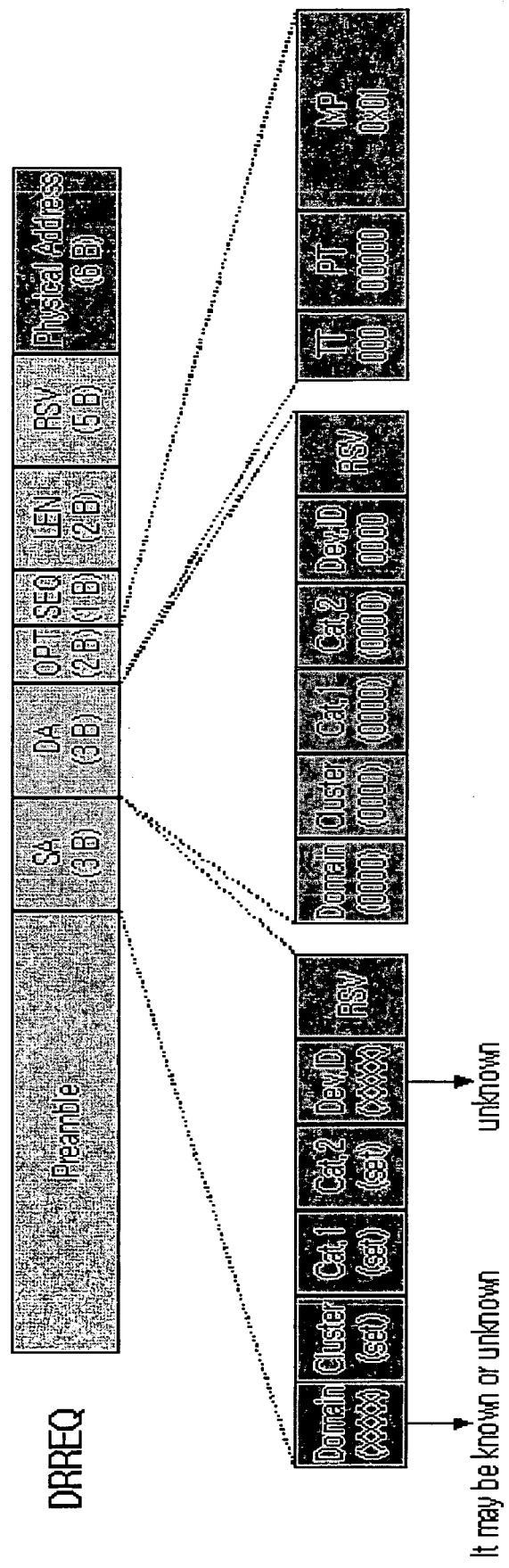
FIGS. 13a and 13b are views for describing an example of a device registration packet.
Figure 13B:
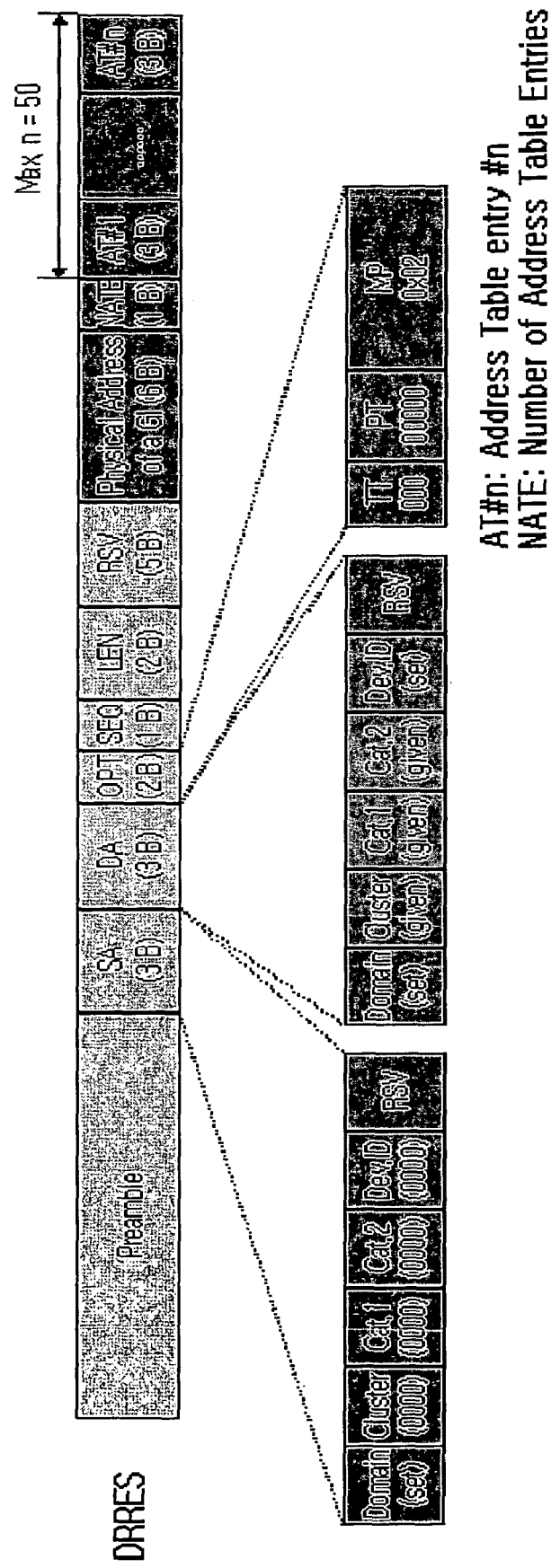

FIGS. 13a and 13b show examples of the device registration packet. The device registration packet is one selected from the group of a DRREQ (device registration request) packet that requests device registration and a DRRES (device registration response) packet that responds to the request of device registration. By using these packets devices can provide a plug and play (hereinafter referred to as "PnP") function.

Figure 14A:
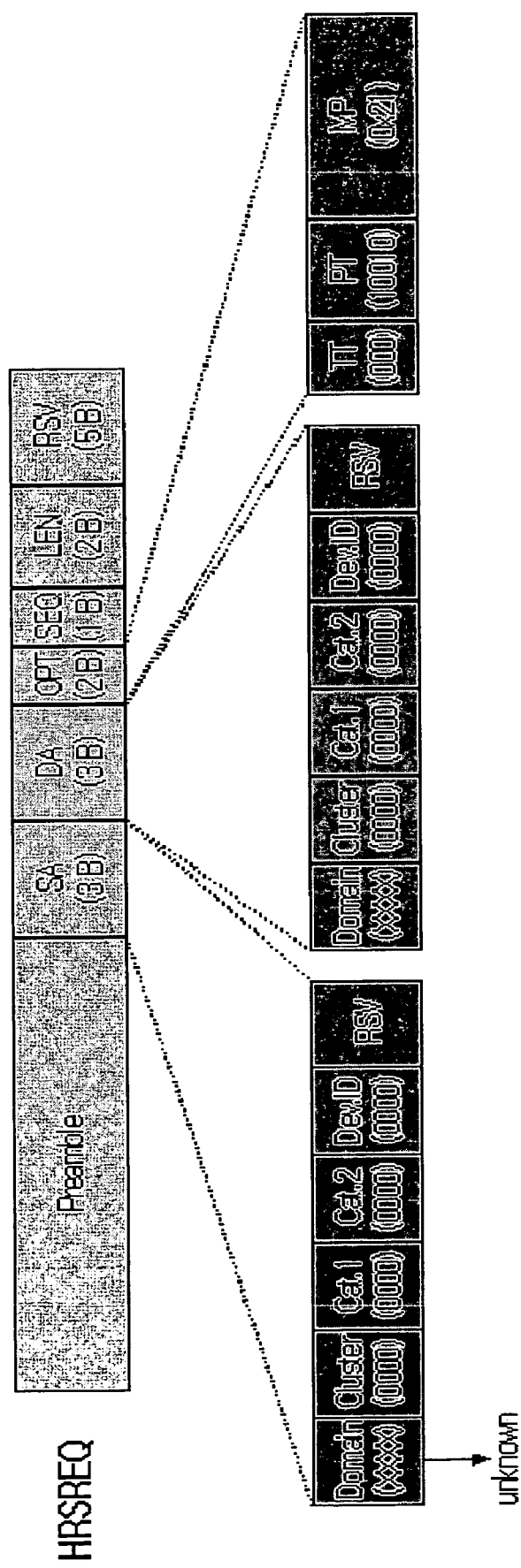
FIGS. 14a through 14e are views for describing an example of a RG or home station registration packet.
Figure 14B:
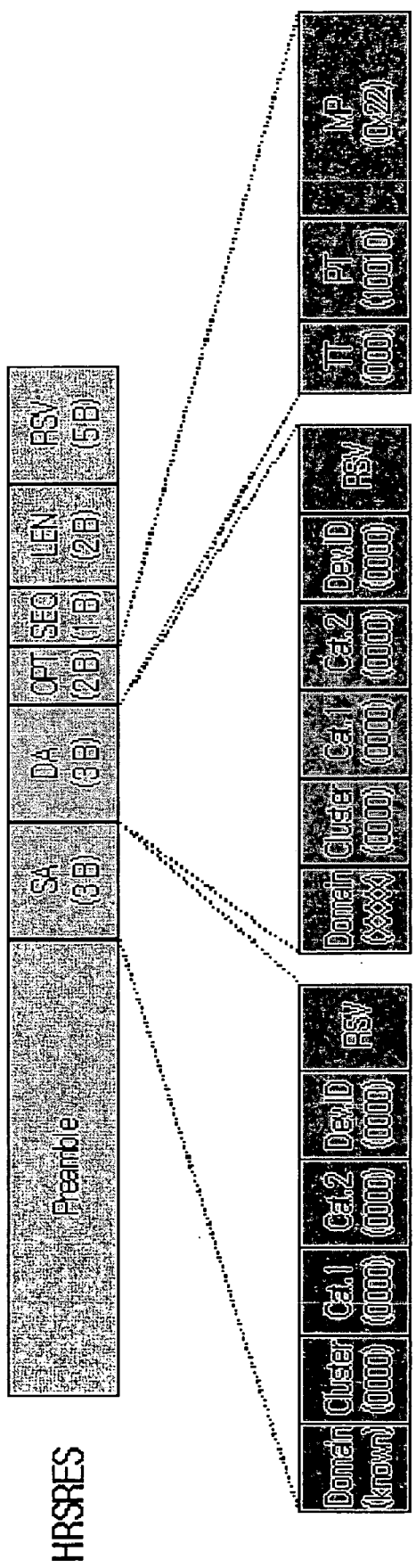
Figure 14C:
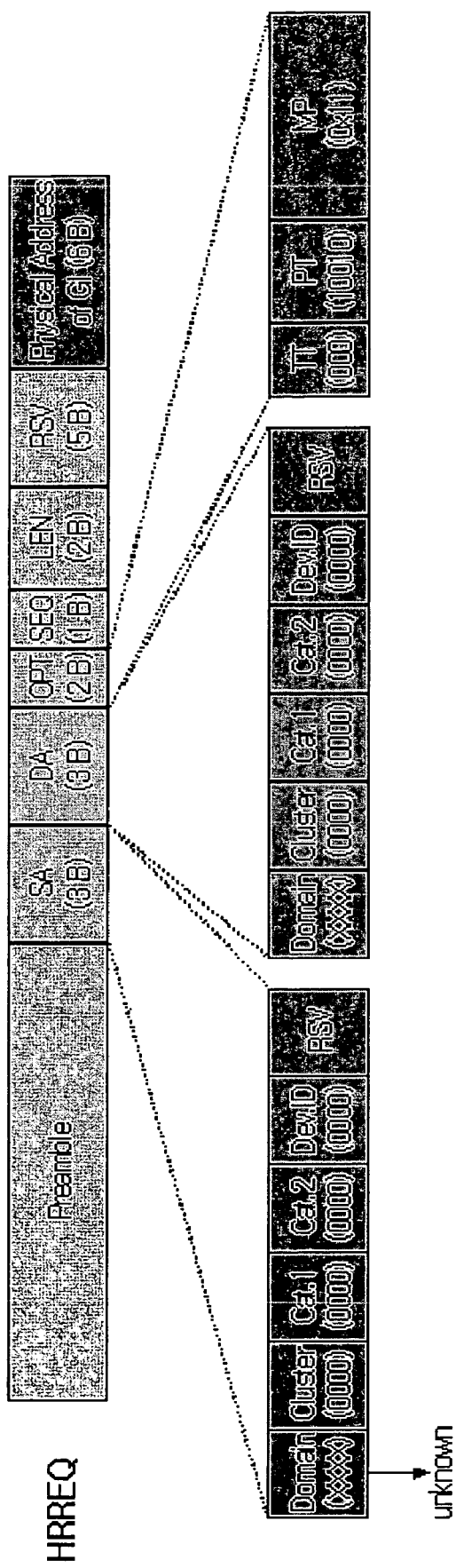
Figure 14D:
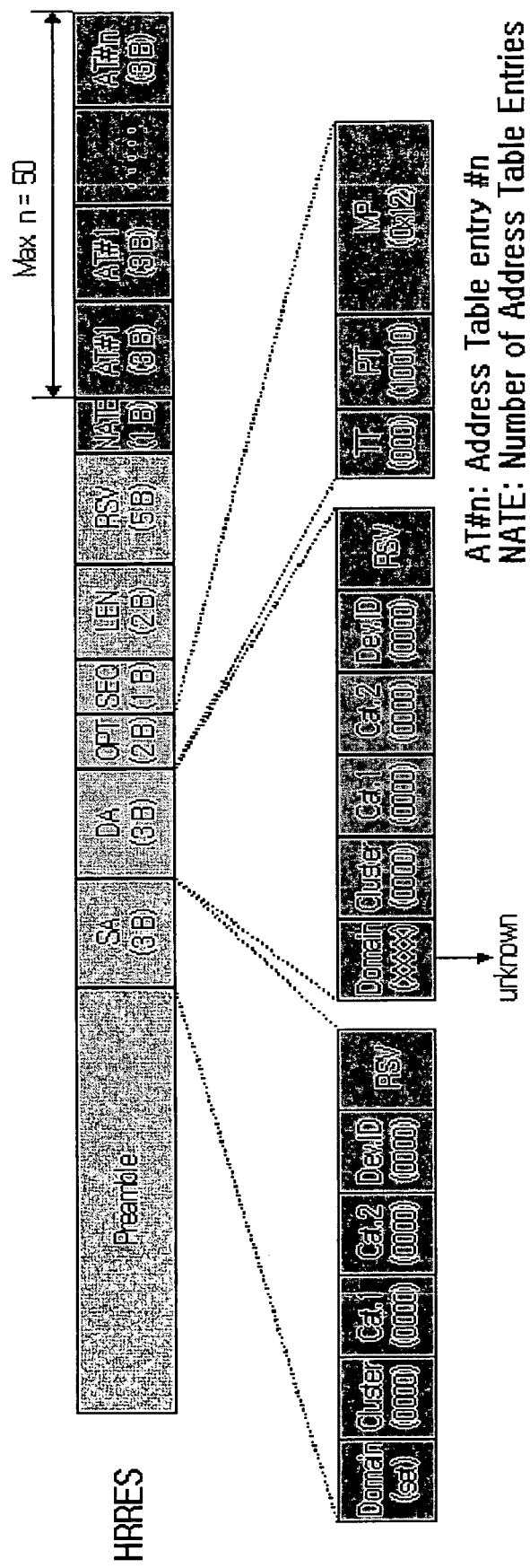
Figure 14E:
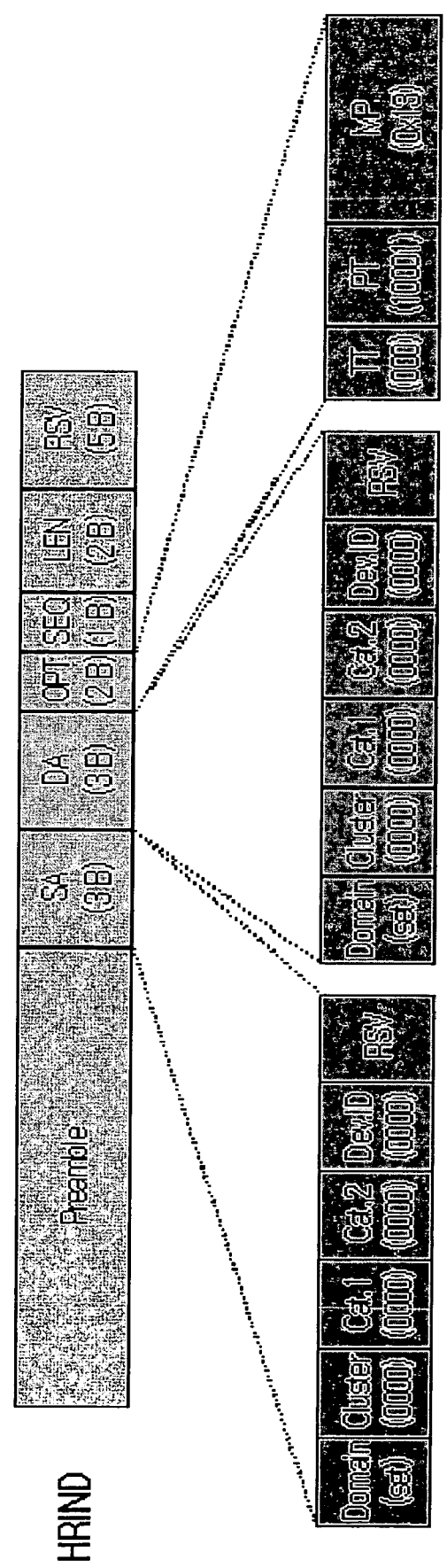

FIGS. 14a through 14c show examples of the RG or home station registration packet. The RG or home station registration packet is one selected from the group of:
 an HRSREQ (home station registration start request) packet that requests start of home station registration;
 an HRSRES (home station registration start response) packet that responds to the request of start of home station registration;
 an BRREQ (home station registration request) packet that requests home station registration;
 an HRRES (home station registration response) packet that responds to the request of home station registration; and
 an HIND (home station registration indication) packet that indicates the home station registration.

By using these packets, home stations can provide a PnP function.

Figure 15A:
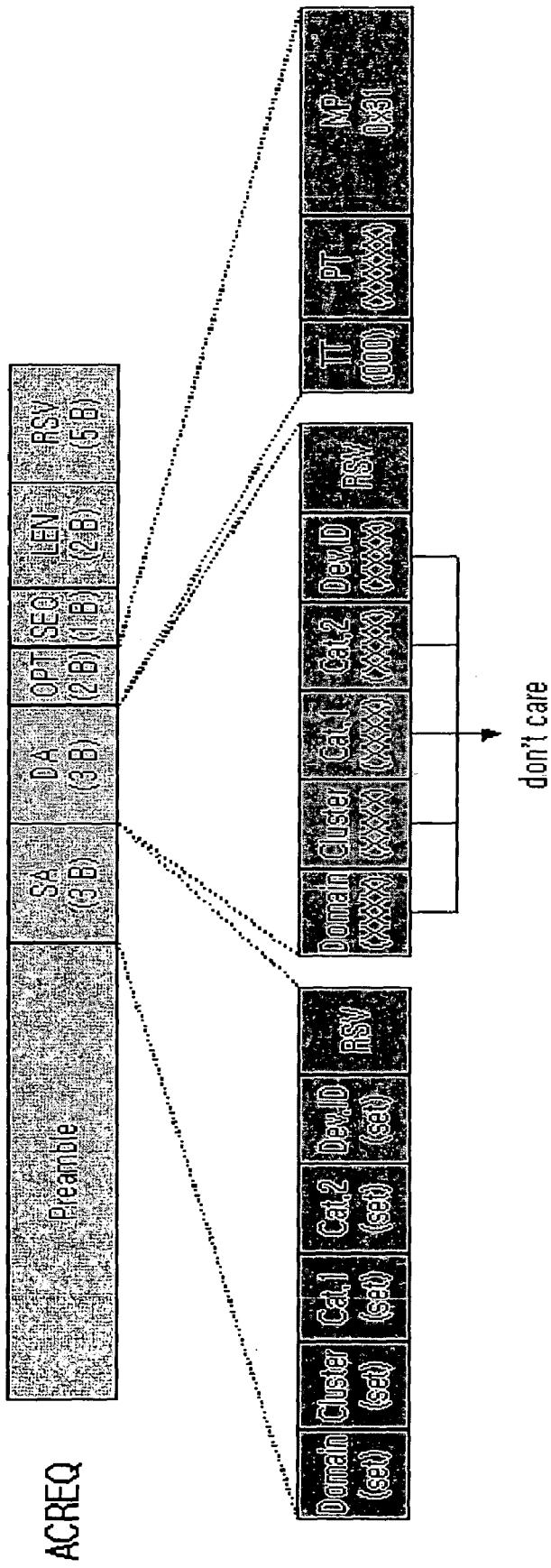
FIGS. 15a and 15b are views for describing an example of an alive-check packet.
Figure 15B:
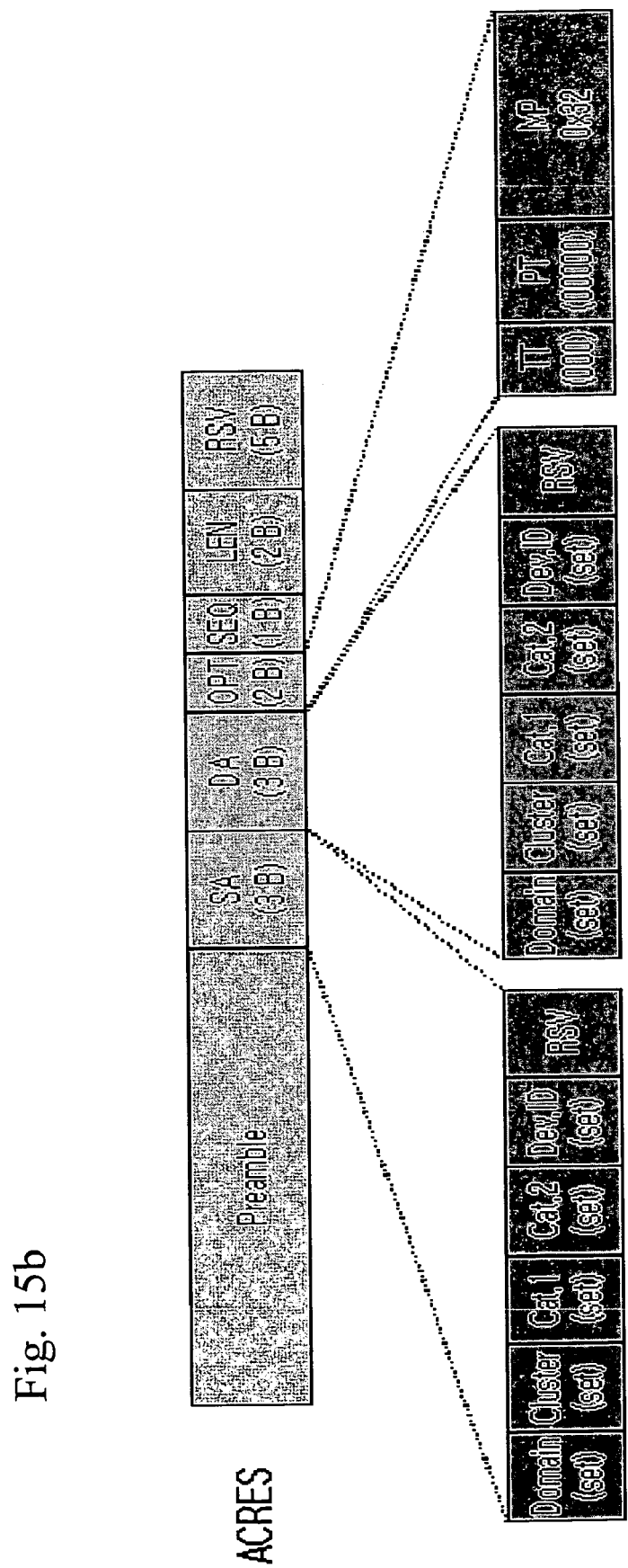

FIGS. 15a and 15b show examples of the alive-check packet. The alive-check packet comprises an ACREQ (alive-check request) packet that requests an alive-check and an ACRES (alive-check response) packet that responds to the alive-check request. The alive-check packet is used to check whether a device or an RG in a home network is working or not.

Figure 16A:
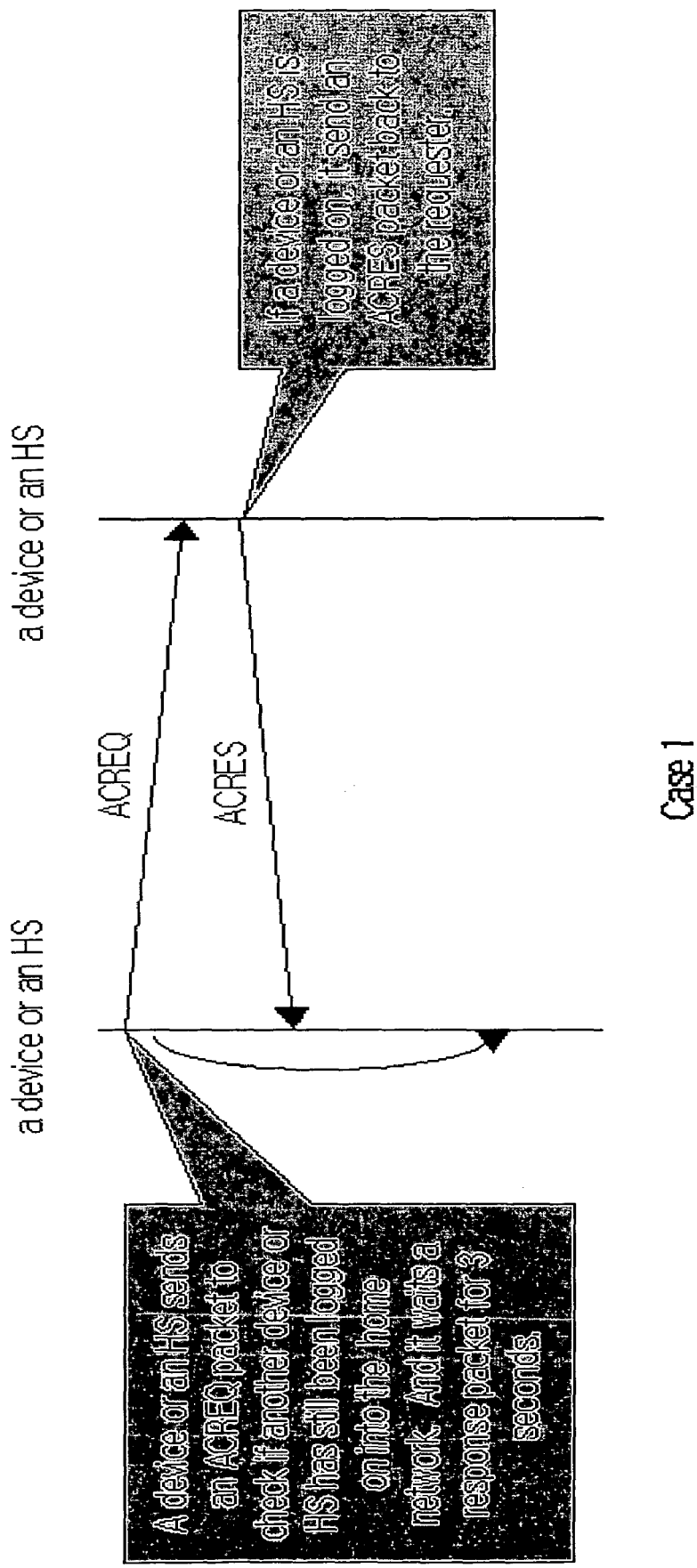
FIGS. 16a and 16b are views for describing an example of a practical use of the alive-check packets.
Figure 16B:
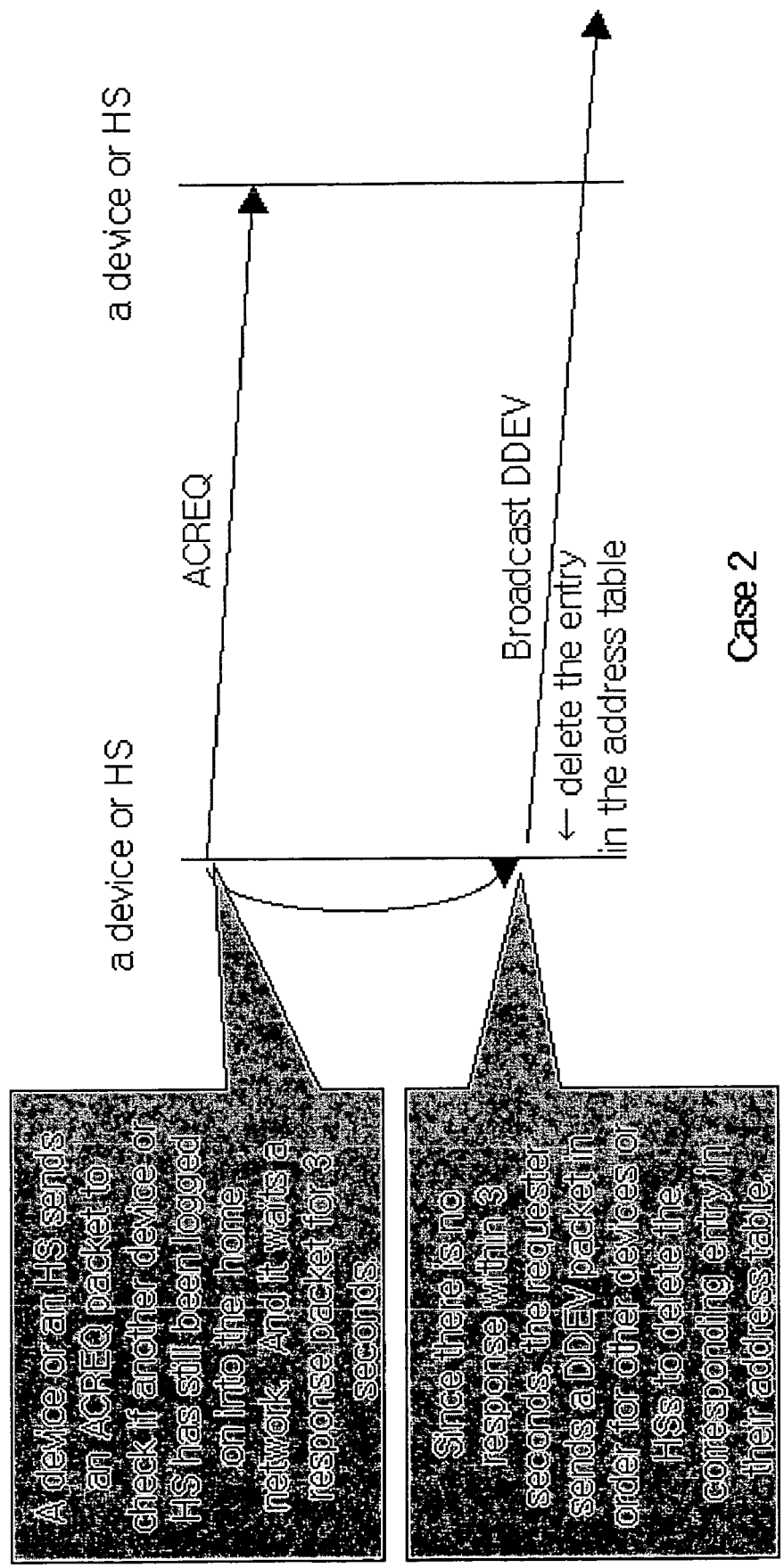

FIGS. 16a and 16b illustrate time-lines of the ACREQ and ACRES packets as an example of using the alive-check packet. Case 1 is when a device or an HS receives the ACRES packet within 3 seconds after sending the ACREQ packet. The device or the HS receiving the ACRES packet understands that another device or HS is still logged on to the home network. Case 2 is when a device or an HS does not receive the ACRES packet within 3 seconds after sending the ACREQ packet. In Case 2, the device or the HS that sent the ACREQ packet broadcasts a DDEV (delete device) packet to other devices or HSs in order to notify that the corresponding device logged out the home network and deletes the address of the corresponding device or HS from its own address table.

Figure 17A:
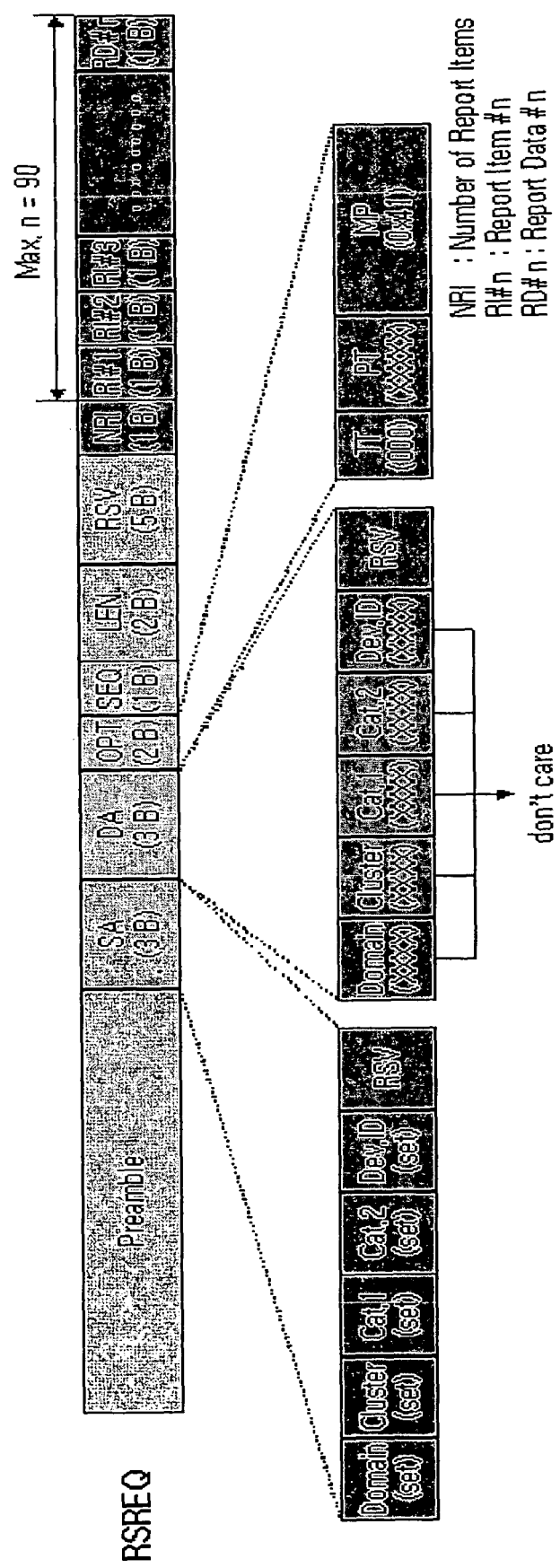
FIGS. 17a through 17c are views for describing an example of a report-status packet.
Figure 17B:
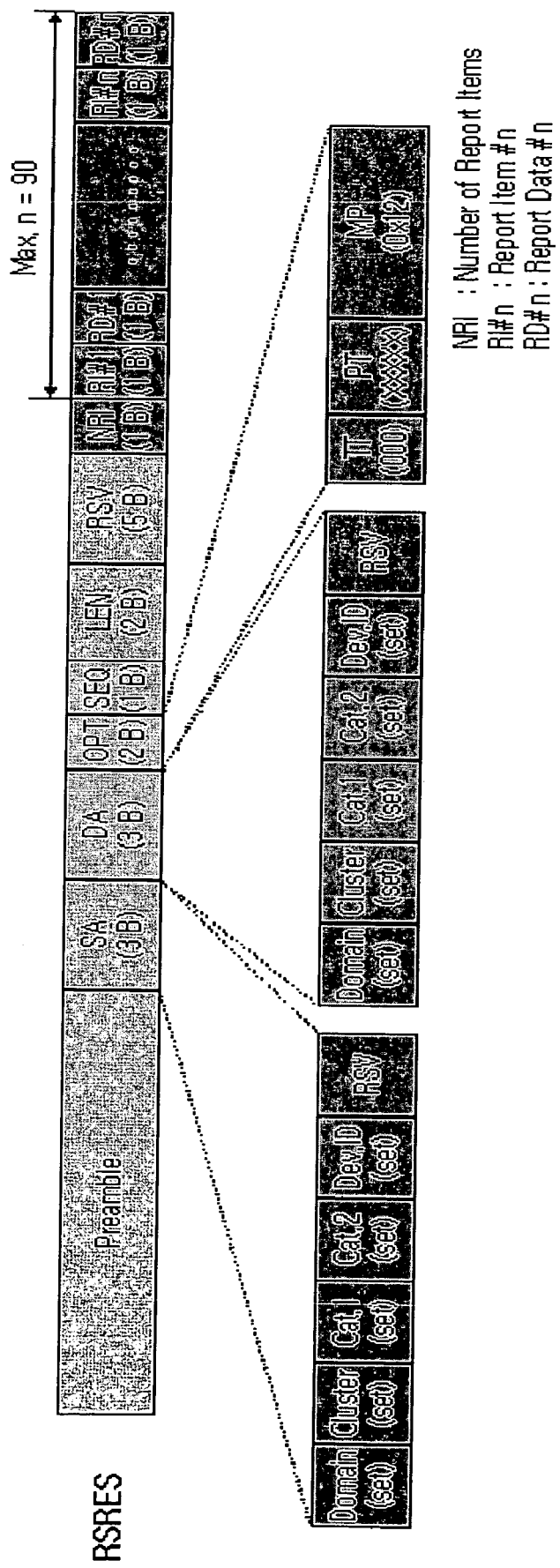
Figure 17C:
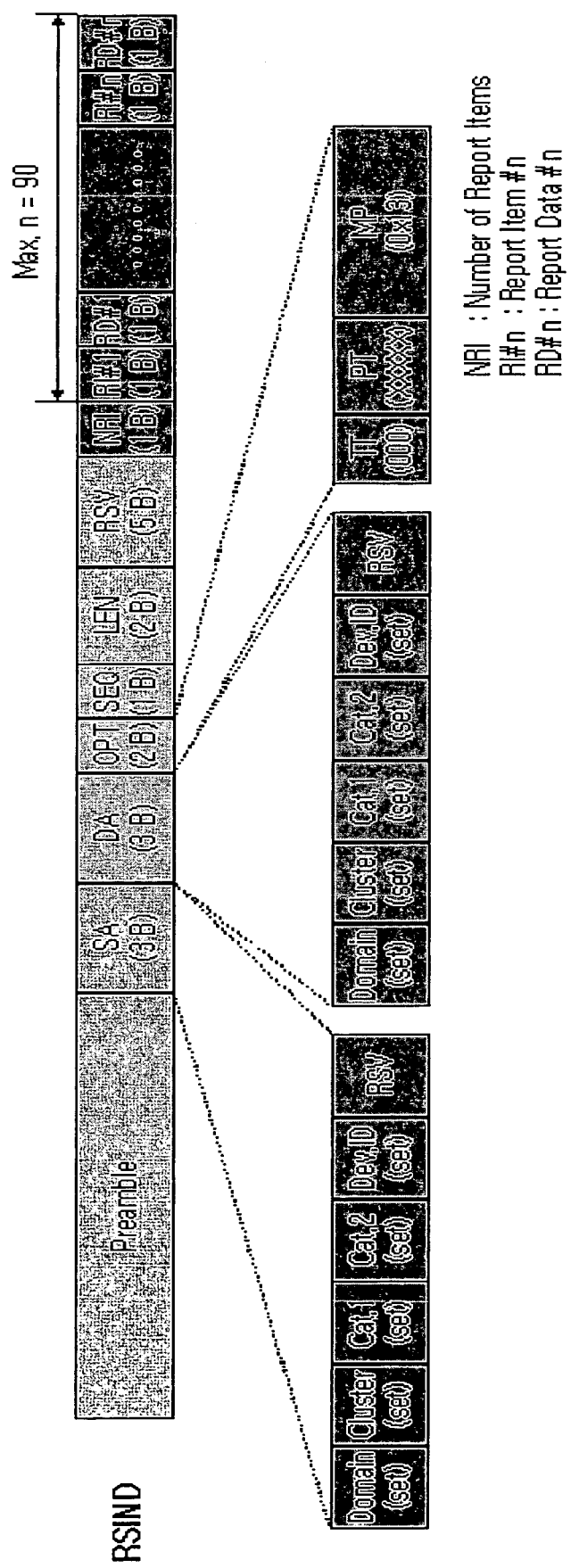

FIGS. 17a through 17c show examples of the report-status packet. The report-status packet is one selected from the group of an RSREQ (report-status request) packet that requests report of status, an RSRES (report-status response) packet that responds the request of report of status, and an RSIND (report-status indication) packet that initializes the report of status.

Figure 18A:
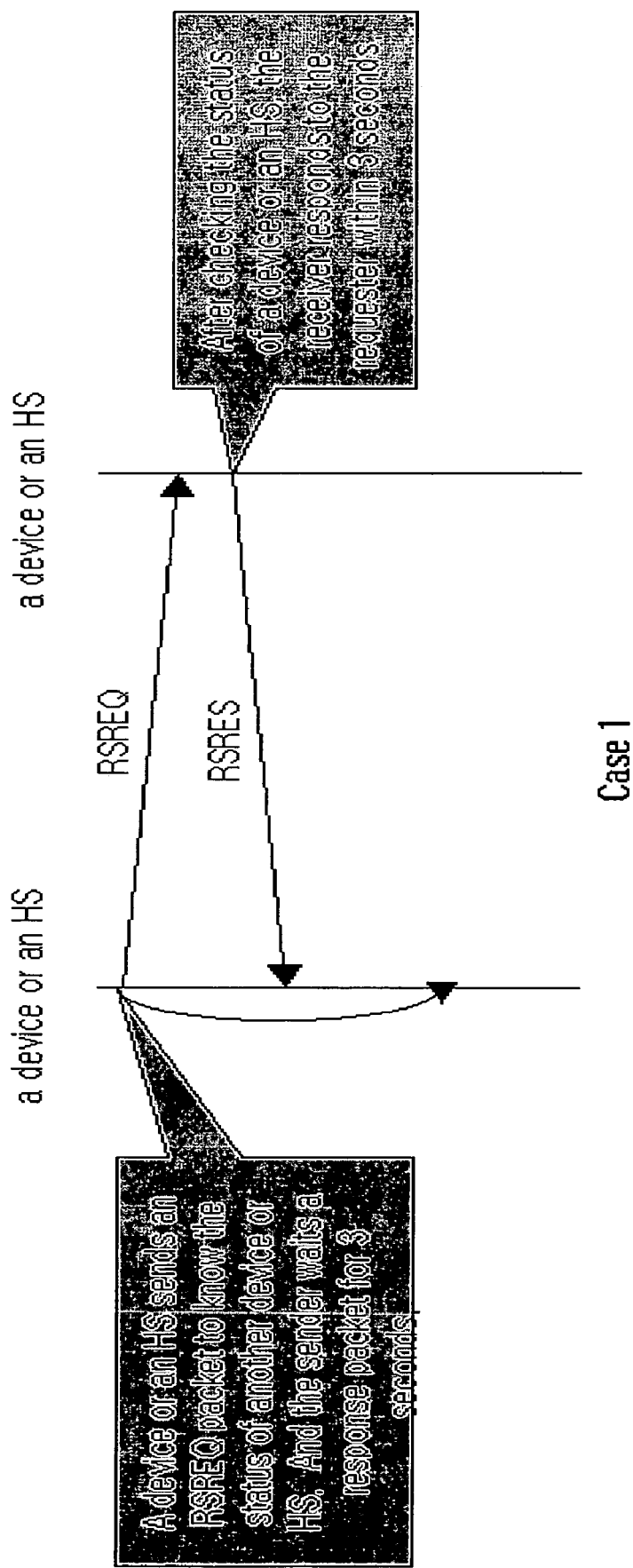
FIGS. 18a and 18b are views for describing an example of a practical use of the report-status packets.
Figure 18B:
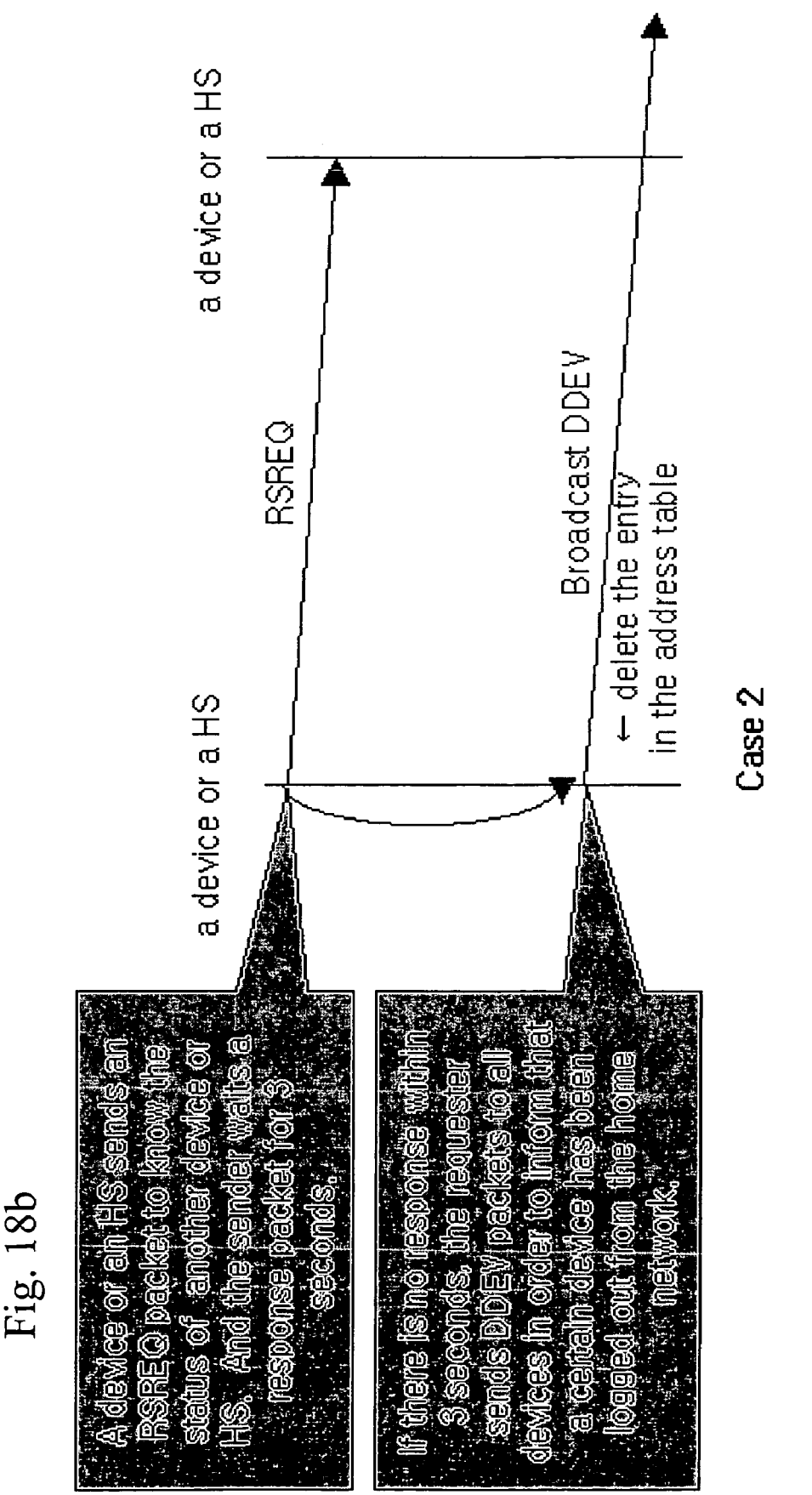
Figure 19A:
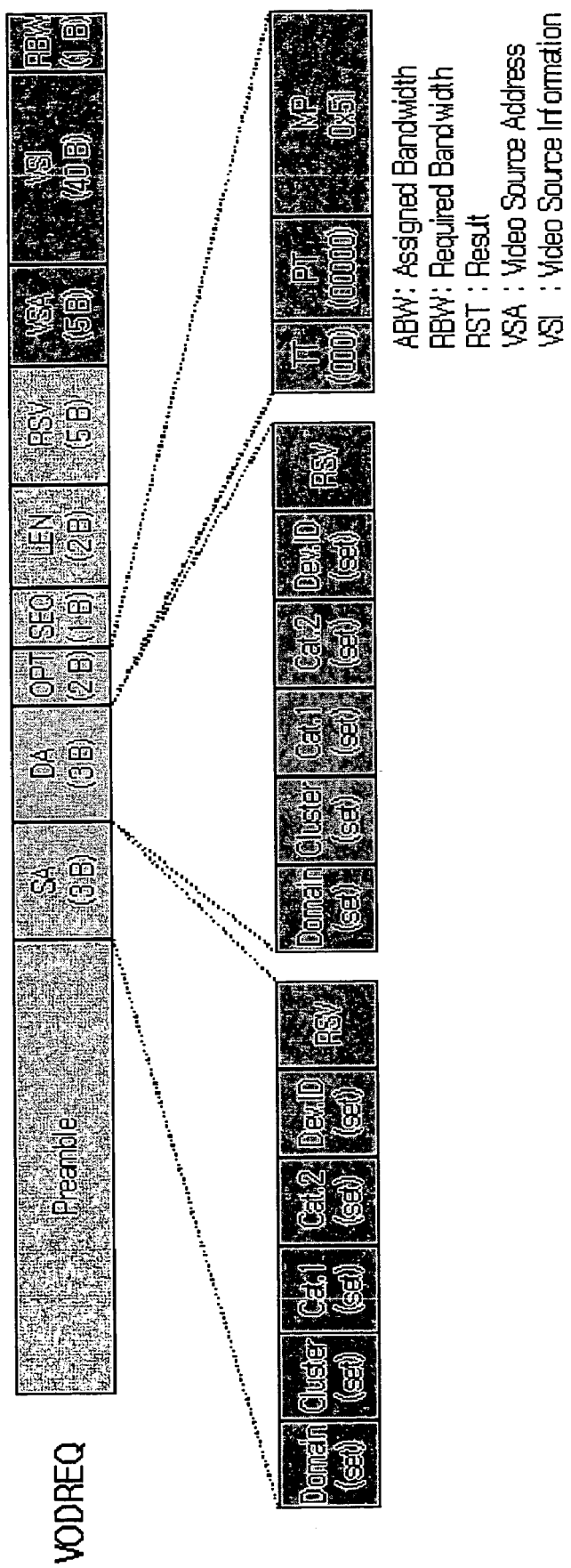
Figure 19B:
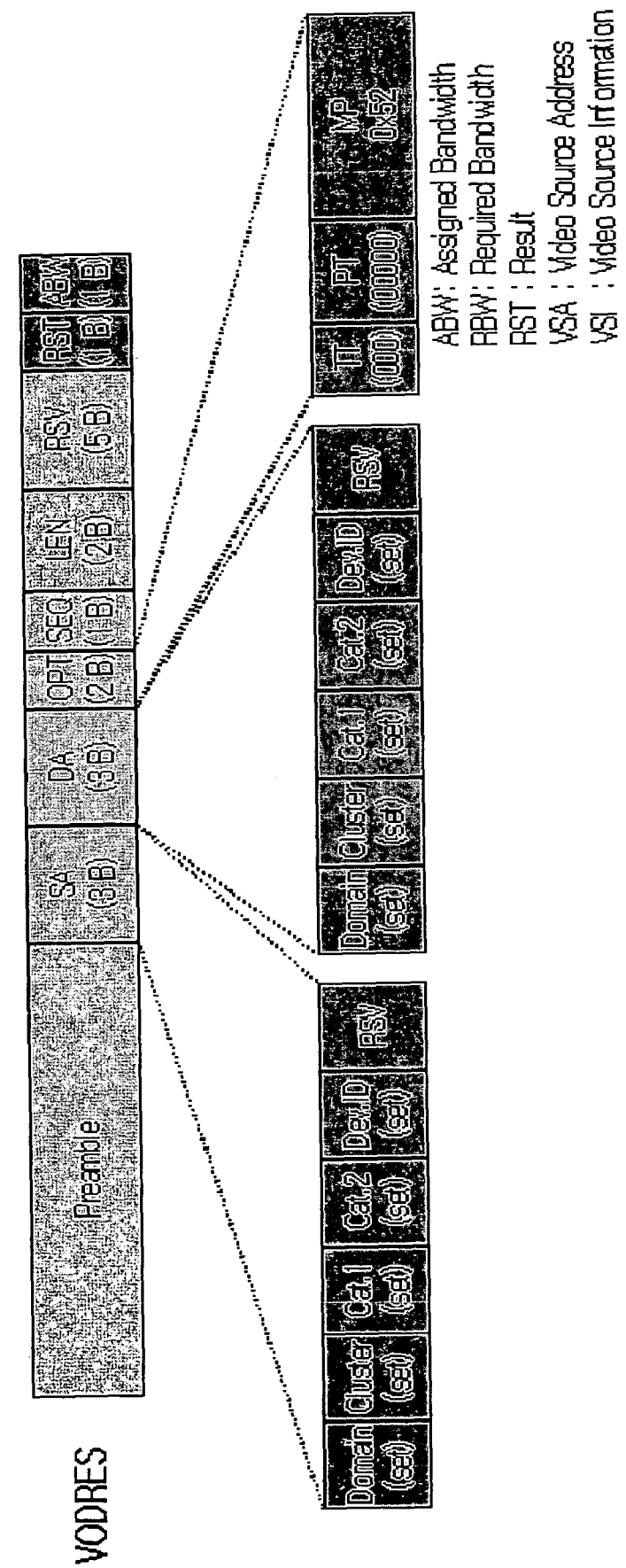
Figure 19C:
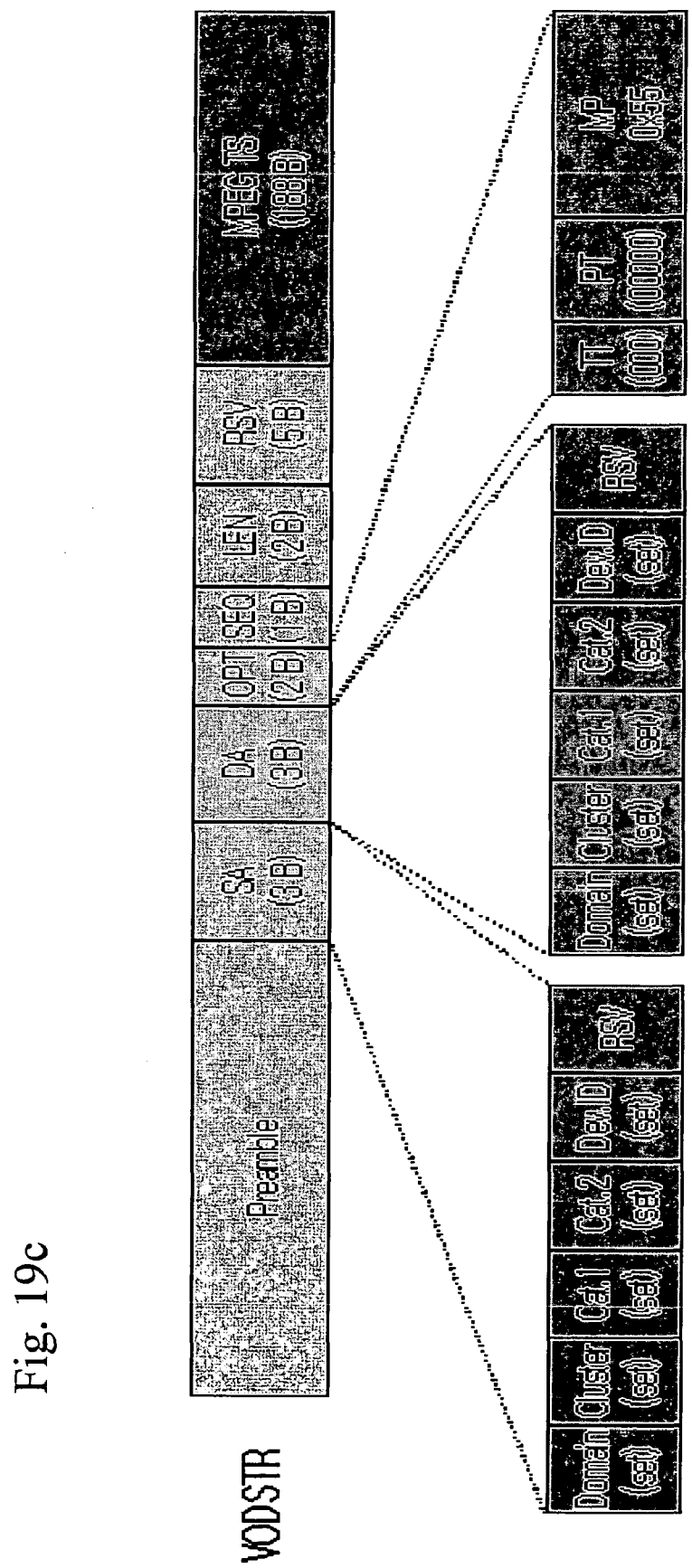

FIGS. 18a and 18b are examples illustrating a practical use of the report-status packet. A device or an HS receiving the RSREQ packet checks its own status and sends the results in the form of RSRES packet. The report-status request item and data about the request item are inserted into a payload part of the RSREQ packet. And, a device or an HS receiving the RSREQ packet sends information about its own urgent status in a form of RSIND packet to the device or HS in its own domain network that sent the RSREQ packet.

Figure 20A:
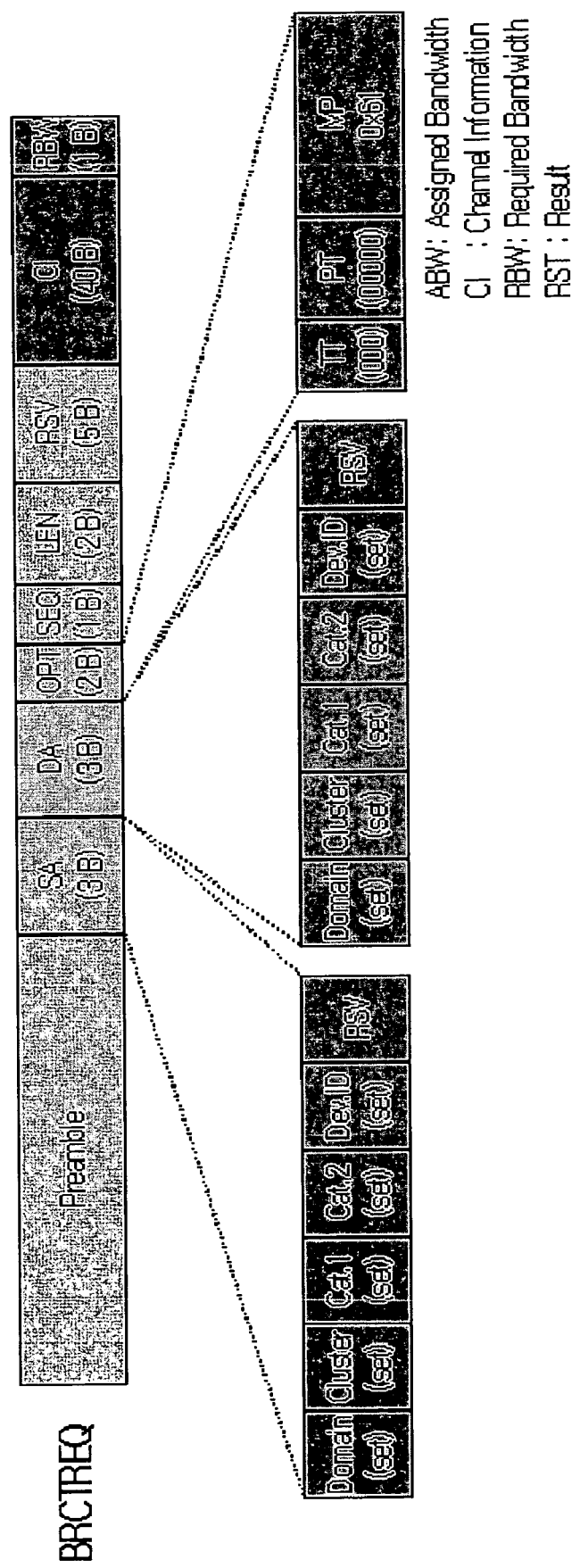
FIGS. 20a through 20c are views for describing an example of a broadcasting MPEG stream packet.
Figure 20B:
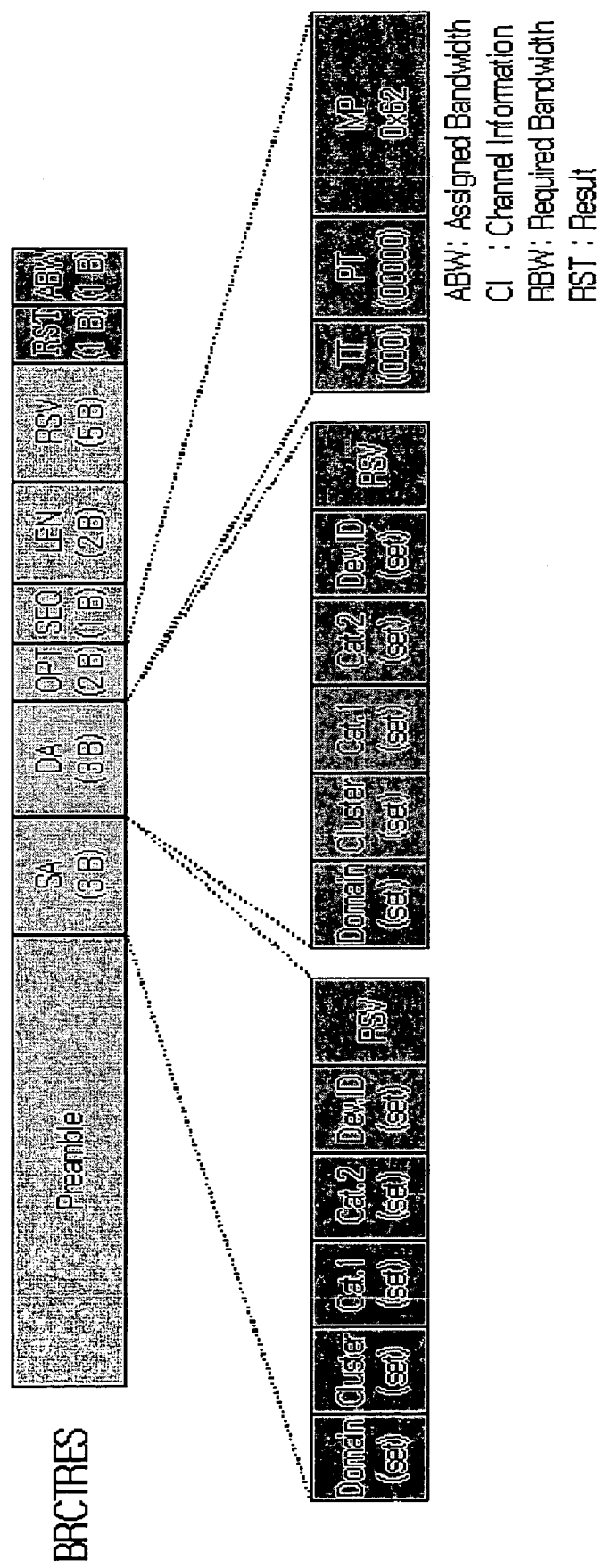
Figure 20C:
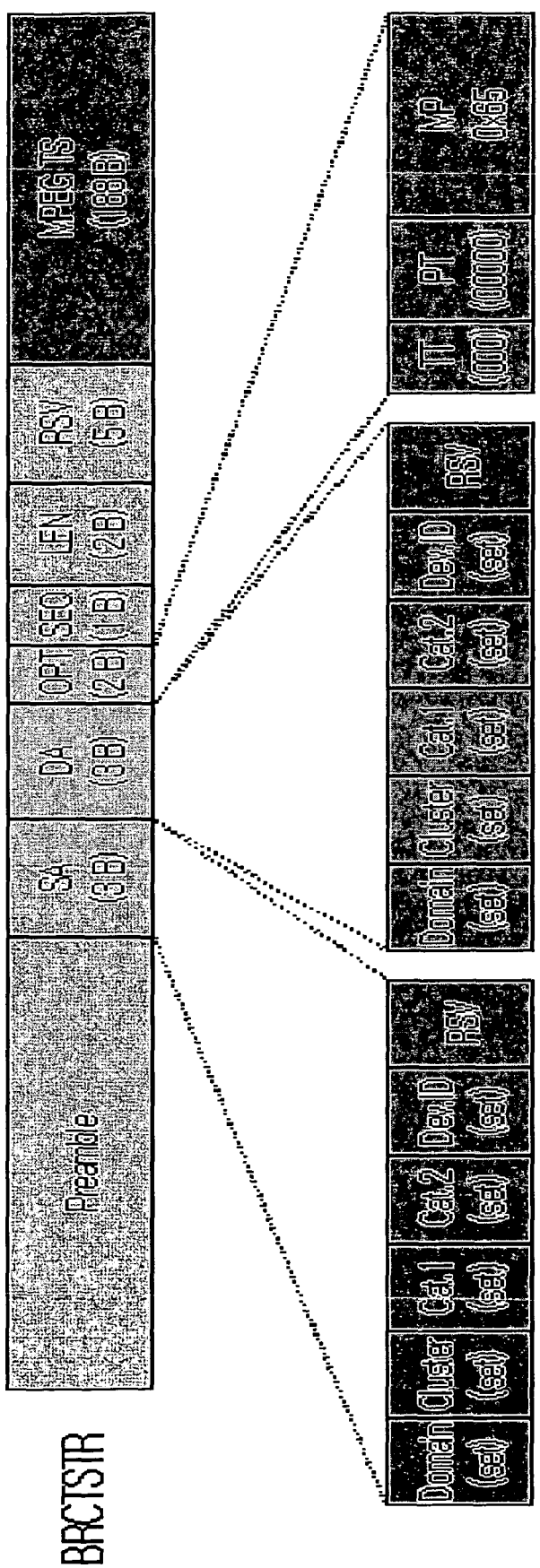
Figure 21A:
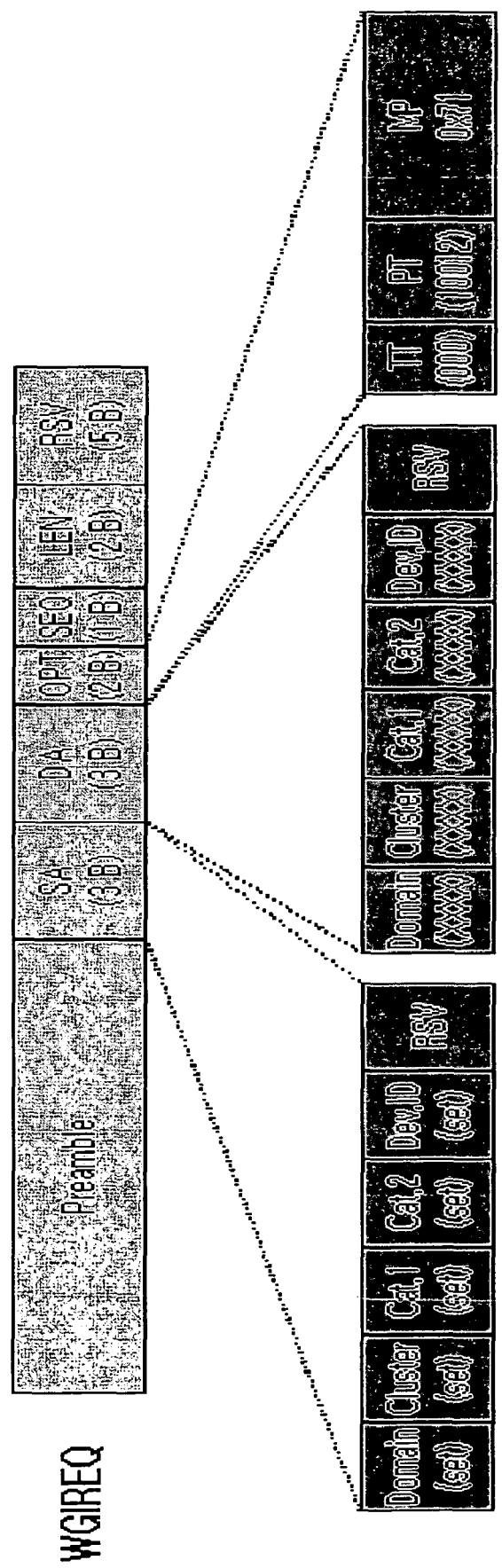
FIGS. 21a through 21f are views for describing an example of a WAN and stream gateway interface packet.
Figure 21B:
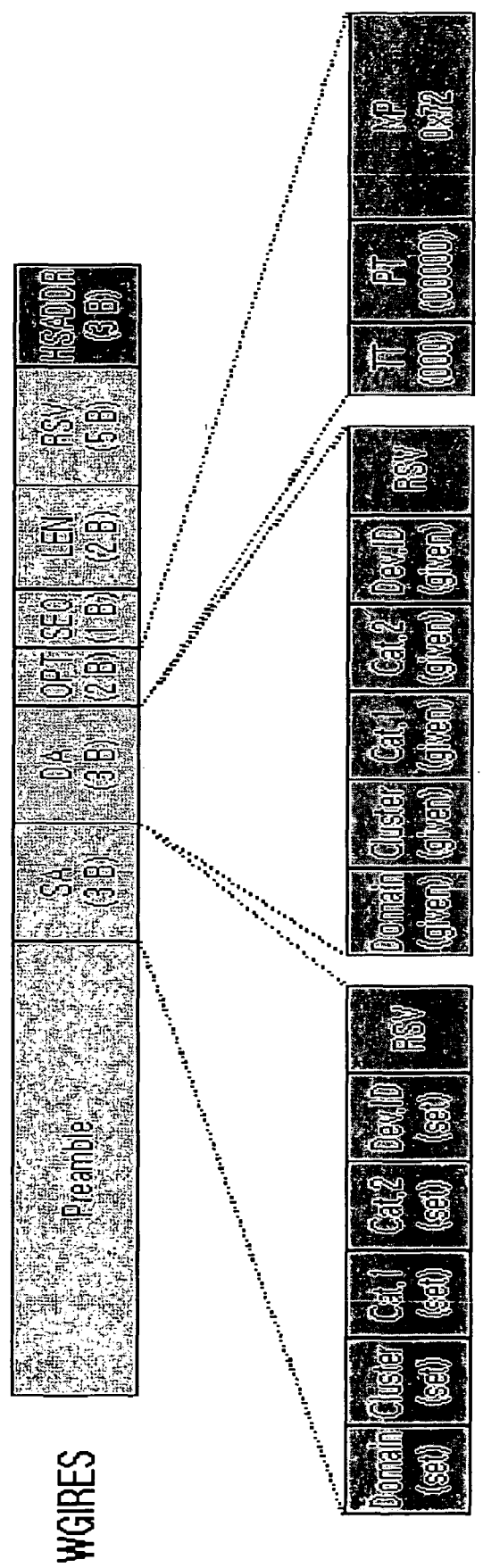
Figure 21C:
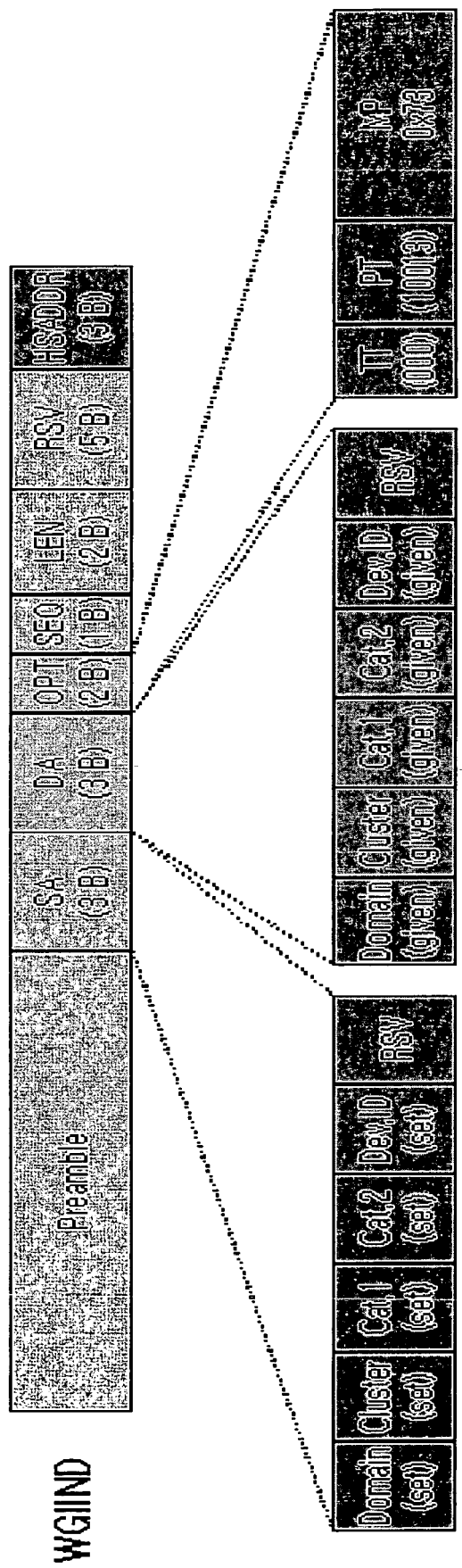
Figure 21D:
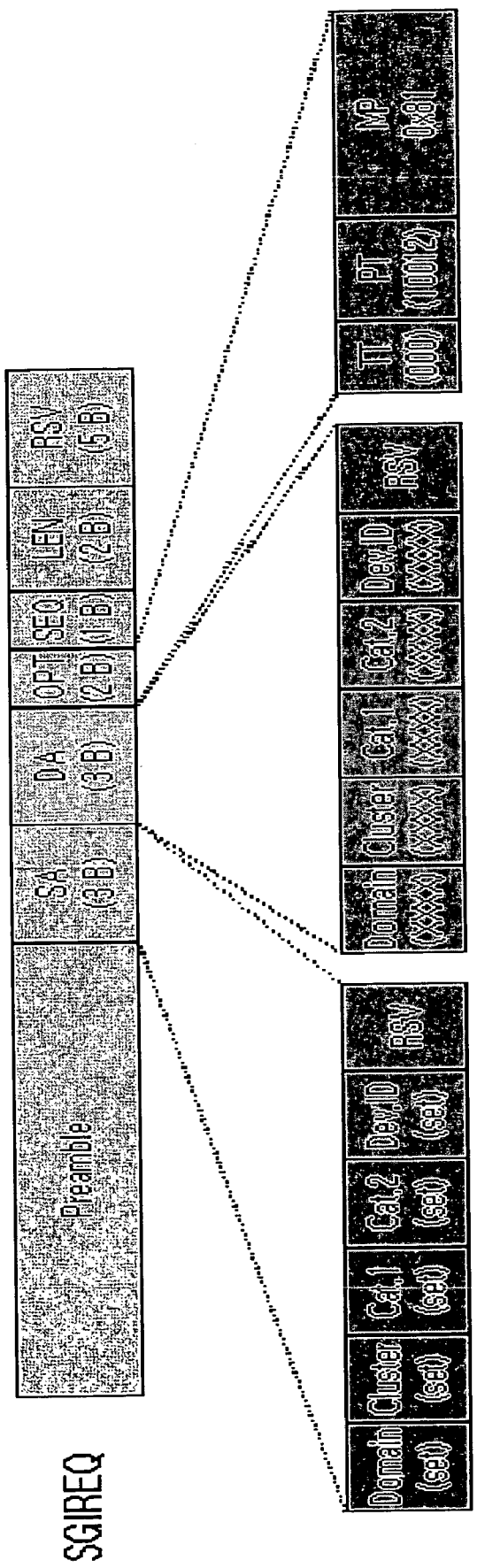
Figure 21E:
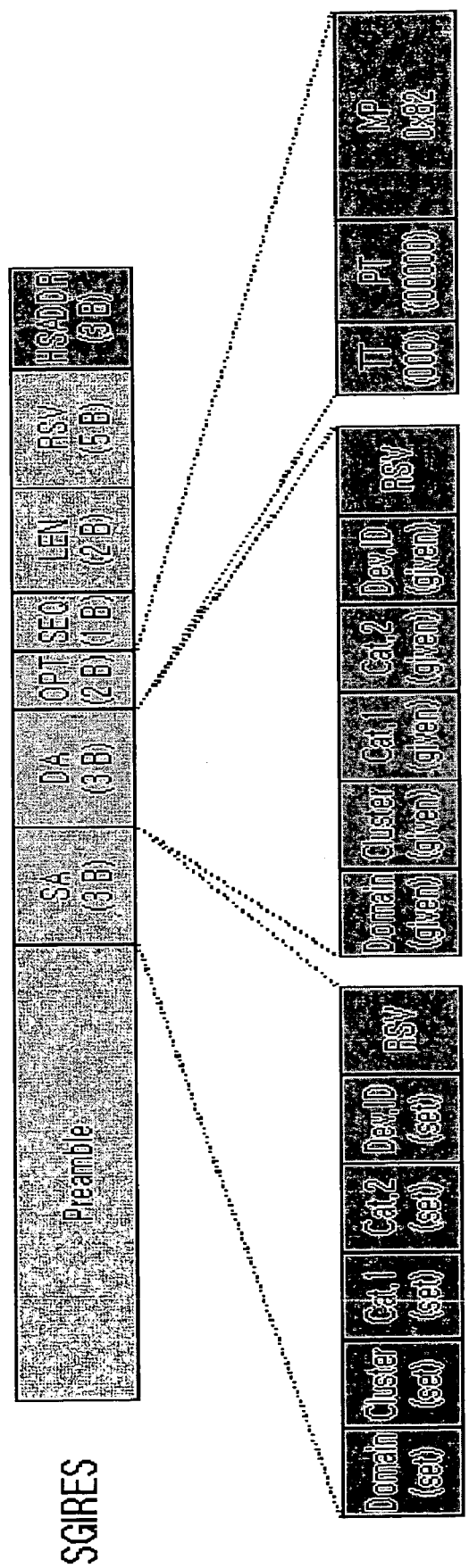
Figure 21F:
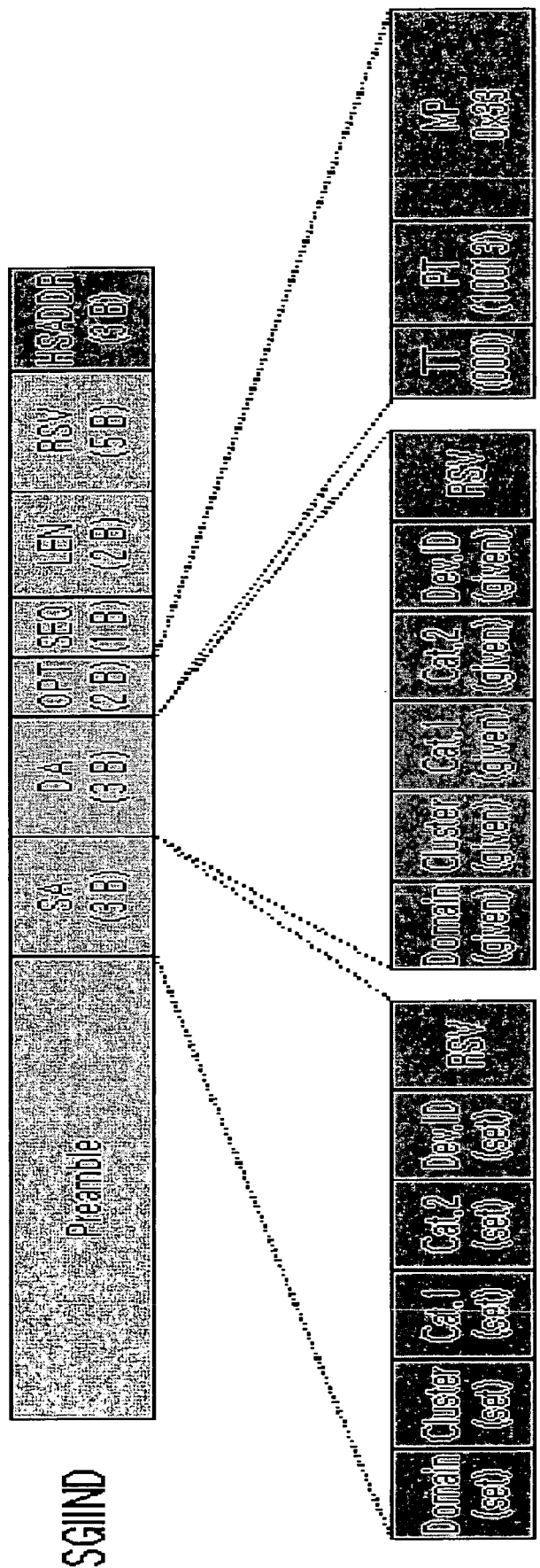

FIGS. 18a through 19c show examples of the VOD MPEG stream packet. The VOD MPEG stream packet is one selected from the group of a VODREQ (VOD request) packet that requests a VOD MPEG stream service, a VODRES (VOD response) packet that responds to the request of VOD MPEG stream service, and a VODSTR (VOD stream) packet. FIGS. 20a through 20c show examples of a broadcasting MPEG stream packet. The broadcasting MPEG stream packet is one selected from the group of a BRCTREQ (broadcasting request) packet that requests a broadcasting MPEG stream service, a BRCTRES (broadcasting response) packet that responds to the request of broadcasting MPEG stream service, and a BRCTSTR (broadcasting stream) packet.

When a device wants VOD and broadcasting stream services, the device sends the VODREQ and BRCTREQ packets to a stream gateway interface. Here, stream information and a required bandwidth are loaded on the VODREQ and BRCTREQ packets. The steam gateway interface sends result for the request and the bandwidth actually assigned to the device in the form of VODRES and BRCTRES packets. Actual stream is transmitted loaded on the MPEG TS of 188 bytes that is enclosed in payloads of the VODSTR and BRCTSTR packets.

FIGS. 21a through 21f show examples of the WAN or stream gateway interface packet. If a device wants access to WAN and a stream service, the device has to know addresses of corresponding gateway interfaces. Therefore, packets performing functions such as requesting the gateway interface address, responding to the request, and informing other devices of the gateway interface addresses are required. As shown in FIGS. 21a through 21f, the WAN or stream gateway interface packet is one selected from the group of:
 a WGIREQ (WAN gateway interface request) packet that requests an address of an WAN gateway interface;
 a WGIRES (WAN gateway interface response) packet that responds to the request of address of an WAN gateway interface;
 a WGIIND (WAN gateway interface indication) packet that initializes the address of an WAN gateway interface;
 a SGIREQ (stream gateway interface request) packet that requests an address of a stream gateway interface;
 a SGIRES (stream gateway interface response) packet that responds to the request of address of a stream gateway interface; and
 a SGIIND (stream gateway interface indication) packet that initializes the address of a stream gateway interface.

Receiving a request of the address, a home station with the gateway interface sends a response packet with a payload including the address of the home station.

Figure 22A:
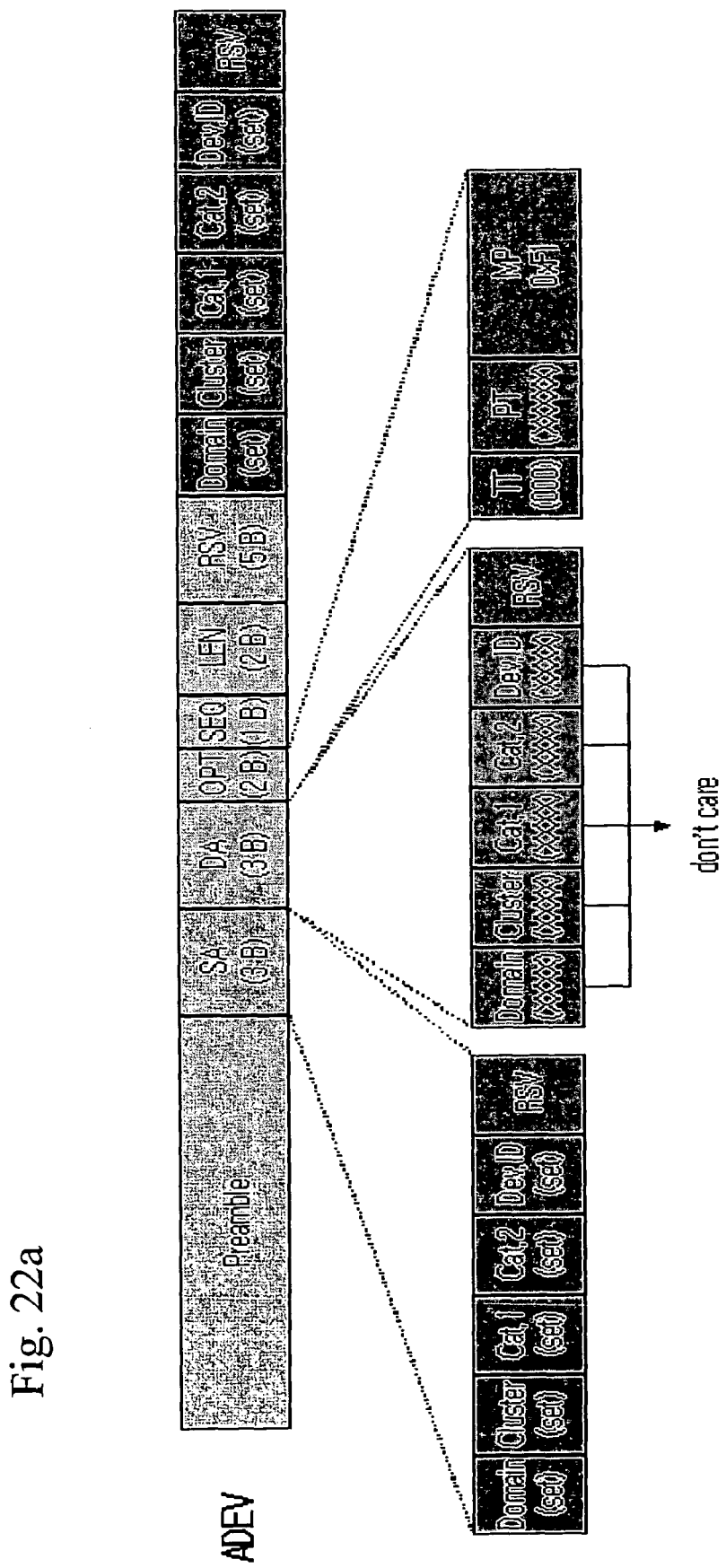
FIGS. 22a through 22c are views for describing an example of an address table management packet.
Figure 22B:
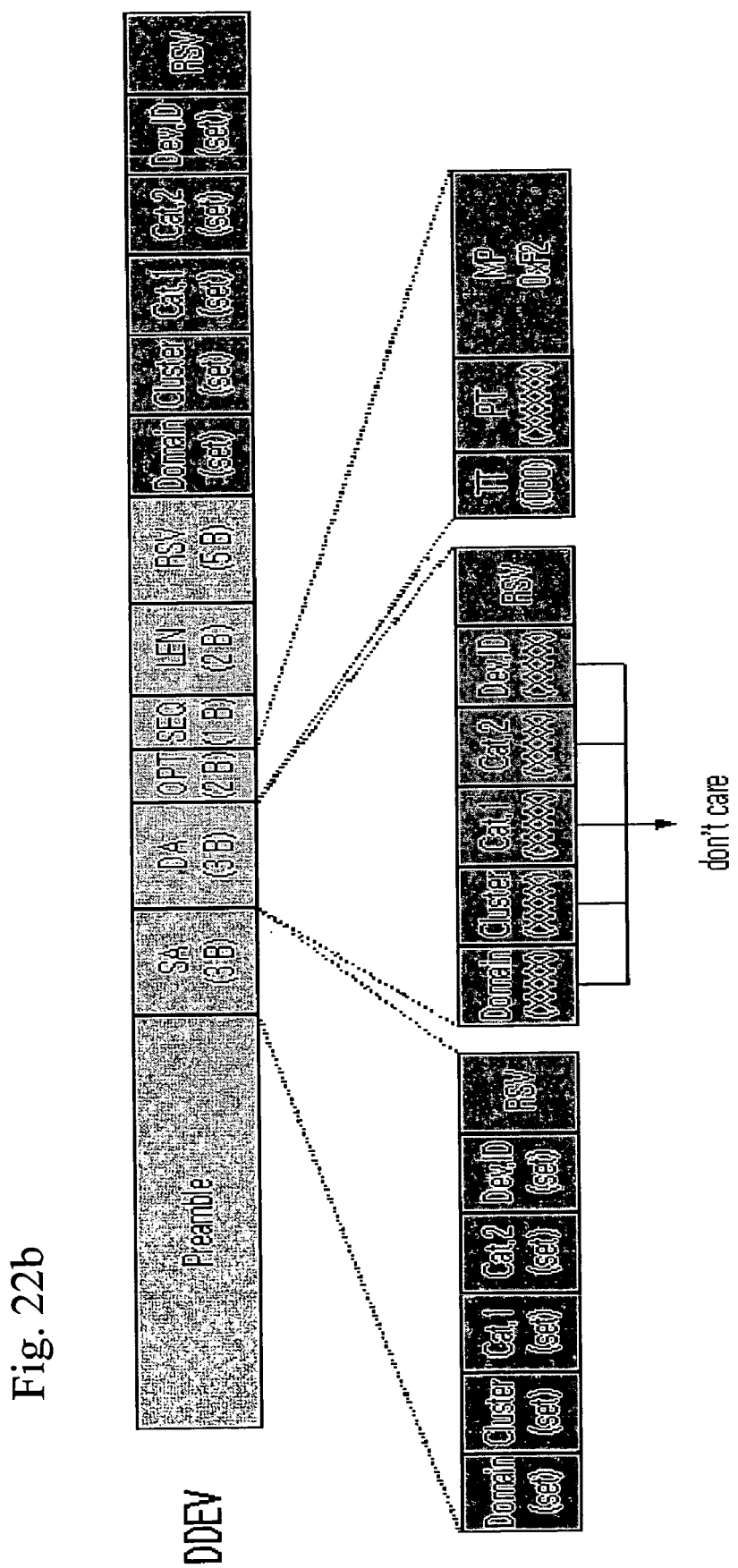
Figure 22C:
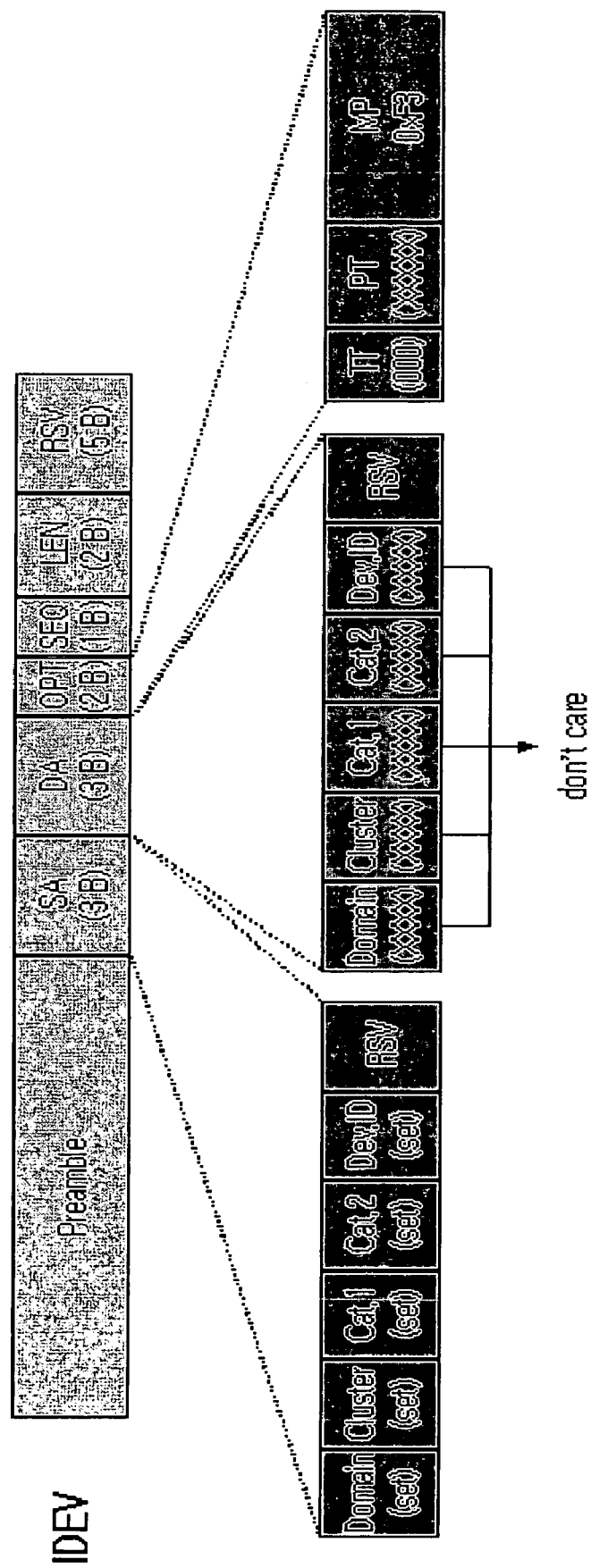

FIGS. 22a through 22c show examples of the address table management packet. The address table management packet is used when a device is added to or removed from a home station and address tables of devices in the home station are initialized. The address table management packet is one selected from the group of an ADEV (add device) packet, a DDEV (delete device) packet, and an IDEV (initialize device) packet. When a device logs on to or logs out from a home network, a home station connected to the device broadcasts the ADEV and DDEV packets in order to inform other devices of a logon of a new device or a logout of an existing device. Devices receiving the ADEV or DDEV packets adds or deletes the address of the corresponding device to/from its own address table. The IDEV packet is used to initialize address tables of devices in the home station.

Figure 23:
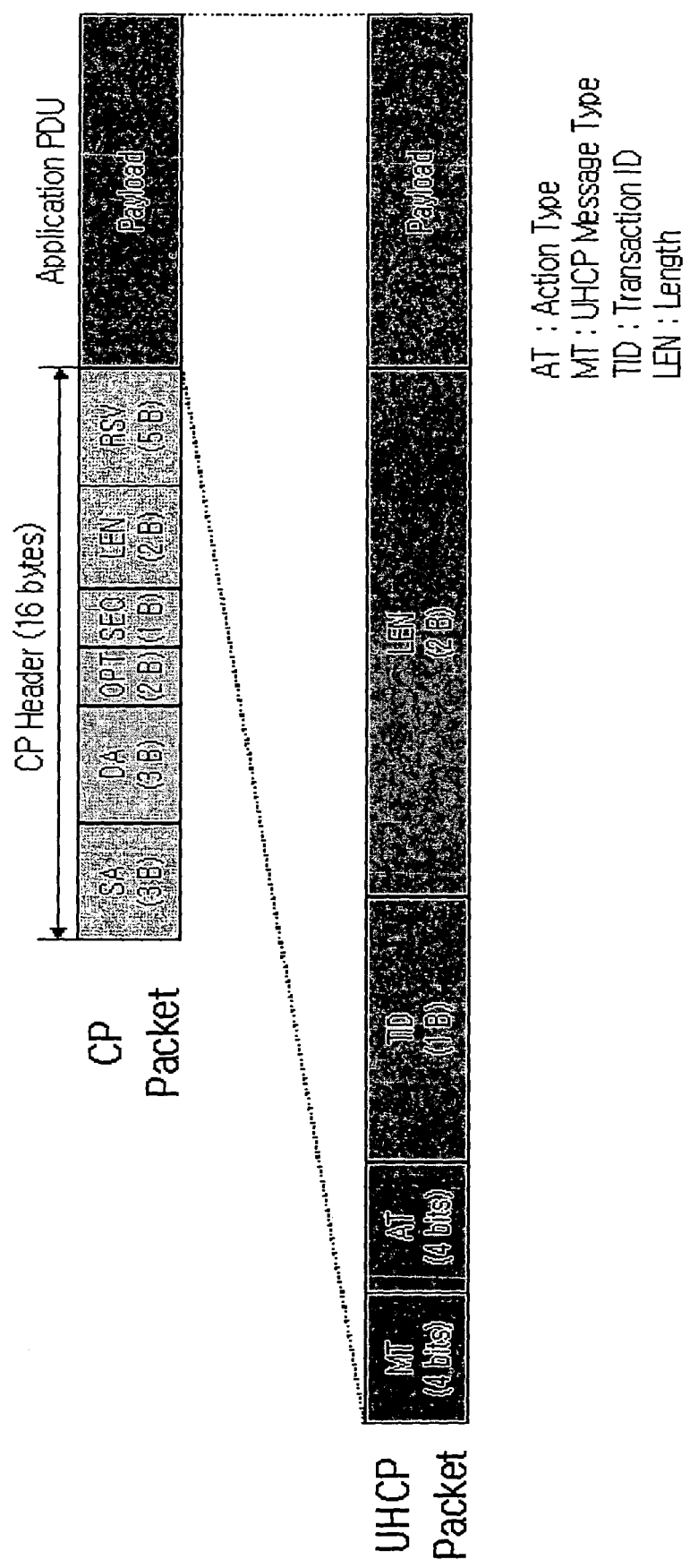
FIG. 23 is a view for describing a structure of a UHCP packet.

FIG. 23 illustrates structure of a UHCP (universal home control protocol) packet. The UHCP packet to control devices in a home is loaded on a payload of the common protocol packet. In order to indicate that the contents loaded on the payload are a device control packet, the management packet field is set as 0xFF, as shown in FIG. 11.

As shown in FIG. 23, the UHCP packet comprises a UHCP header of 4 bytes and a payload. The UHCP header field comprises a message type (MT), an action type (AT), a transaction ID (TID), and a length field (LEN). The MT field indicates a type of a message. The message is divided into three types such as execution (0x1), query (0x2) and notification (0x3). The AT field describes in detail the action of the message. Each action is defined according to the type of the message. The TID is an ID used to identify a particular response message corresponding to a particular request message when a plurality of response messages arrived. The LEN indicates length of a payload of the UHCP packet as bytes.

FIG. 24 shows an example of the UHCP packet having the execution message. The execution message is used to execute the AT field. If the MT field has the execution message, the AT field has one value selected from the group of act, register, and response. The 'act' is used to make a device conduct an order in the payload. The 'register' is used to register attributes of device in the payload on the home station. The 'response' is used to respond to the 'act' and the 'register' packets.

FIG. 25 shows an example of the UHCP packet having the query message. The query message is used to query the contents of the AT field. If the MT field has the query message, the AT field has one value selected from the group of act, device directory, attribute directory, and response. The 'act' is used to request information about status of a device. The 'device directory' is used to request directory information of a device in a home network. In the UHCP packet having the query message and the AT field with the 'device directory', nothing is loaded on a payload of UHCP packet. The 'attribute directory' is used to request attribute information. In the UHCP packet having the query message and the AT field with the 'attribute directory', nothing is loaded on the payload of UHCP packet. The 'response' is used to respond to the request of the 'act', the 'device directory', and the 'attribute directory'.

Figure 26:
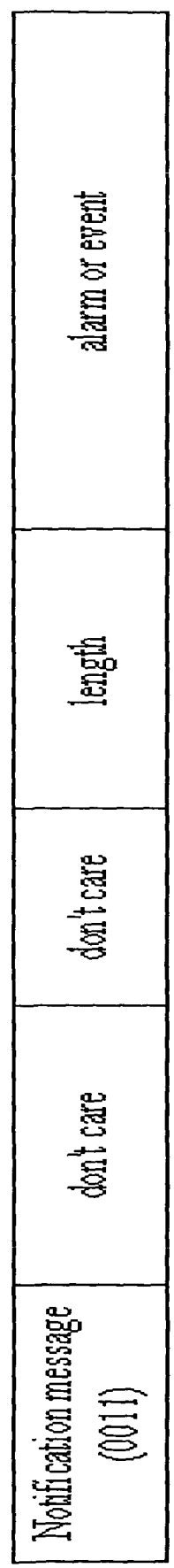
FIG. 26 is a view for describing an example of a UHCP packet having notification message.

FIG. 26 shows an example of the UHCP packet having the notification message. The notification message is used when devices in a home network notify their own particular events or alarms. In the UHCP packet having the notification message, the AT and TID fields are not used.

INDUSTRIAL APPLICABILITY

Accordingly, common protocol layer architecture and methods for transmitting data between different network protocols and a common protocol packet according to the present invention makes it possible for a network using a particular protocol to communicate with any other network using a different protocol by placing a common protocol layer in or under an application layer. In addition, by assigning a common address to all devices in all networks using a common protocol, the present invention provides advantages that the devices can be effectively managed and communicate with one another, and that operation status of devices using various network protocols can be checked through gateways. Moreover, by designing a common protocol layer and common protocol packet structure, which are capable of accepting various network protocols simultaneously, the present invention can improve compatibility between different network protocols.

What is claimed is:

1. A method for transmitting data between different network protocols having a network protocol layer architecture based on the Open Systems Interconnection (OSI) reference model, the method comprising:

receiving, at a common protocol layer, application data from an application layer of a first network device and generating a first common protocol unity packet by attaching a preamble and a common protocol header to the application data;

transmitting the first common protocol unity packet to a first outside interface module between the first network device and a common protocol processing chip set;

transmitting a common protocol packet produced by removing the preamble from the first common protocol unity packet, from the first outside interface module to the common protocol processing chip set;

switching, at the common protocol processing chip set, the common protocol packet to a second outside network interface module between the common protocol processing chip set and a second network device according to a destination address of the common protocol header; and perceiving, at the second outside network interface module, the common protocol packet as application data, attaching a preamble and a common protocol header to the common protocol packet generating a second common protocol unity packet, and transmitting the second common protocol unity packet to the second network device;

wherein transmitting of data through the common protocol layer is bypassed when the first network device communicates with another device using the same protocol in a network, and is performed when the first network device communicates with a second network device using a different protocol in the network, and wherein the common protocol header, comprises:

a source address having information about a source of a signal transmitted;

a destination address having information about a destination of the signal transmitted;

an option field related to a traffic type, a packet transmission method, and home network management;

a sequence field used in segmentation and reassembly processes; a length field indicating magnitude of application data; and a reserved field for use hereafter; and wherein the common protocol layer performs packet switching, broadcast or multicast, address conversion, device control, packet classification, security, congestion access control, and resource management.

2. The method as defined by claim 1, wherein the network protocol based on the OSI reference model is one selected from the group consisting of TCP/IP protocol, IEEE1394 protocol, a protocol that embodies user-oriented systems, and a protocol used in wireless systems.

3. The method as defined as claim 1, the common protocol layer functions as an internal interface for QoS, security, and communication management inside a home station chip.

4. The method as defined by claim 1, wherein the transmitting of data through the common protocol layer comprises: transmitting data through an existing application layer; and transmitting data through a particular standard application program interface (API).

5. The method as defined by claim 1, wherein the common protocol packet comprises a common protocol header with information about a packet and a payload with the contents of data.

6. The method as defined by claim 5, wherein an Universal Home Control Protocol (UHCP) packet to control a device is loaded on the payload.

7. The method as defined by claim 6, wherein the UHCP packet has a header field comprising:
- a message type field indicating a type of message; an action field describing in detail an action of message;
- a transaction Identification (ID) field distinguishing a plurality of messages simultaneously arrived; and
- a length field indicating length of the payload of the UHCP packet.

8. The method as defined by claim 7, wherein the message type is one selected from the group consisting of:
- an execution message used to execute the action type field;
- a query message used to query the contents of the action type field; and
- a notification message used when devices in a home network notify their own particular events or alarms.

9. The method as defined by claim 8, wherein, if the message type is the execution message, the action type field has one value selected from the group consisting of:
- an act used to make a device conduct an order in the payload; a register used to register attributes of device in the payload on the home station; and a response used to respond to the act and the register packet.

10. The method as defined by claim 8, wherein, if the message type is the query message, the action type field has one value selected from the group consisting of:
- an act used to request information about status of a device; a device directory used to request directory information of a device; an attribute directory used to request attribute information; and
- response used to respond to the request of the act, the device directory, and the attribute directory.

11. The method as defined by claim 1, wherein the common protocol header is 16 bytes in size.

12. The method as defined by claim 1, wherein the source address is 3 bytes in size.

13. The method as defined by claim 1, wherein the destination address is 3 bytes in size.

14. The method as defined by claim 1, wherein the option field is 2 bytes in size.

15. The method as defined by claim 1, wherein the option field comprises:
- a traffic type field distinguishing control command data, real time data, and non-real time data;
- a packet type field defining a packet transmission method; and
- a management packet field for home network management provided by the common protocol.

16. The method as defined by claim 15, wherein the traffic type field is 3 bits in size.

17. The method as defined by claim 15, wherein the packet type field is 5 bits in size.

18. The method as defined by claim 15, wherein the management packet field is 8 bits in size.

19. The method as defined by claim 15, wherein, according to value of the management packet field, the common protocol packet becomes one selected from the group consisting of:
- a device registration packet providing a plug and play (PnP) function for a device;
- a home station registration packet providing a PnP function for a home tation;
- an alive-check packet checking whether a device or a residential gateway (RG) in a home network is working or not;
- a report-status packet checking status of a device and sending the result; a Video on Demand (VOD) Moving Picture Expert Group (MPEG) stream packet related to VOD MPEG stream service;
- a broadcasting MPEG stream packet related to broadcasting MPEG stream service;
- a Wide Area Network (WAN) and stream gateway interface packet for an address of a home station with a gateway interface; and
- an address table management packet for addition and removal of a device to/from the home station.

20. The method as defined by claim 19, wherein the device registration packet is one selected from the group consisting of:
- a Device Registration Request (DRREQ) packet requesting device registration, the DRREQ packet being sent to a home station by the device at the start of device registration; and
- a Device Registration Response (DRRES) packet responding to the request of device registration, the DRRES packet being sent to the device by the home station after the home station received the DRREQ packet.

21. The method as defined by claim 19, wherein the home station registration packet is one selected from the group consisting of:
- a Home Station registration Start Request (HRSREQ) packet requesting start of home station registration;
- a Home Station Registration Start Response (HRSRES) packet responding to the request of the start of home station registration;
- a Home Station Registration Request (HRREQ) packet requesting home station registration;
- a Home Station Registration Response (HRRES) packet responding to the request of home station registration; and
- a Home Station Registration Indication (HRIND) packet indicating the home station registration.

22. The method as defined by claim 19, wherein the alive-check packet is one selected from the group consisting of:
- an Alive-Check Request (ACREQ) packet requesting to check whether a device is working; and
- an Alive-Check Response (ACRES) packet responding whether the device is logged on to a home network.

23. The method as defined by claim 19, wherein the report-status packet is one selected from the group consisting of:
- a Report-Status Request (RSREQ) packet including report-status request item and data about the request item;
- a Report-Status Response (RSRES) packet including the result of checking status of a device; and
- a Response-Status Indication (RSIND) packet used to send information about device's urgent status to a home station.

24. The method as defined by claim 19, wherein the VOD MPEG stream packet is one selected from the group consisting of:
- a VOD Request (VODREQ) packet requesting a VOD MPEG stream service;
- a VOD Response (VODRES) packet responding to the request of the VOD MPEG stream service; and
- a VOD Stream (VODSTR) packet used to transmit MPEG stream, the MPEG stream being loaded on a payload of the VODSTR packet.

25. The method as defined by claim 19, wherein the broadcasting MPEG stream packet is one selected from the group consisting of:

a Broadcasting Stream (BRCTREQ) packet requesting a broadcasting MPEG stream service;

a Broadcasting Response (BRCTRES) packet responding to the request of the broadcasting MPEG stream service; and a Broadcasting Stream (BRCSTR) packet used to transmit MPEG stream, the MPEG stream being loaded on a payload of the BRCTSTR packet.

26. The method as defined by claim 23, wherein the WAN and stream gateway interface packet is one selected from the group consisting of:

a WAN Gateway Interface Request (WGIREQ) packet requesting an address of a WAN gateway interface;

a WAN Gateway Interface Response (WGIRES) packet responding to the request of an address of a WAN gateway interface;

a WAN Gateway Interface Indication (WGIIND) packet initializing the address of WAN gateway interface;

a Stream Gateway Interface Request (SGIREQ) packet requesting an address of a stream gateway interface;

a Stream Gateway Interface Response (SGIRES) packet responding to the request of an address of a stream gateway interface; and a Stream Gateway Interface Indication (SGIIND) packet initializing the address of stream gateway interface.

27. The method as defined by claim 19, wherein the address table management packet is one selected from the group consisting of:

an Add Device (ADEV) packet informing a home station of a logon of a new device;

a Delete Device (DDEV) packet informing the home station of a logout of a device; and an Initialize Device (IDEV) packet initializing address tables of devices in the home station.

28. The method as defined by claim 1, wherein the sequence field is 1 byte in size.

29. The method as defined by claim 28, wherein the sequence field comprises a sequence number field for indication of a present sequence number in the segmentation and a last packet field for indication of the last packet.

30. The method as defined by claim 29, wherein the sequence number field is 7 bits in size.

31. The method as defined by claim 29, wherein the last packet field is 1 bit in size.

32. The method as defined by claim 1, wherein the length field is 1 byte in size.

33. The method as defined by claim 1, wherein the reserved field is 5 bytes in size.

* * * * *

UNITED STATES PATENT AND TRADEMARK OFFICE
CERTIFICATE OF CORRECTION

PATENT NO. : 7,882,254 B2
APPLICATION NO. : 10/536189
DATED : February 1, 2011
INVENTOR(S) : K. Choi et al.

It is certified that error appears in the above-identified patent and that said Letters Patent is hereby corrected as shown below:

At column 13, line 64 (claim 19, line 7) of the printed patent, please change "tation" to --station--.

Signed and Sealed this
Twentieth Day of September, 2011

David J. Kappos
*Director of the United States Patent and Trademark Office*